US006453338B1

(12) United States Patent
Shiono

(10) Patent No.: US 6,453,338 B1
(45) Date of Patent: *Sep. 17, 2002

(54) ELECTRONIC MAIL APPARATUS AND COMPUTER READABLE RECORD MEDIUM HAVING ELECTRONIC MAIL PROGRAM RECORDED THEREON

(75) Inventor: Taku Shiono, Chiba (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/094,556

(22) Filed: Jun. 15, 1998

(30) Foreign Application Priority Data

Feb. 13, 1998 (JP) .............................. 10-030773

(51) Int. Cl.[7] .............................. G06F 15/16
(52) U.S. Cl. ...................... 709/206; 709/246; 707/532; 379/93.24; 714/20; 714/26; 714/39; 714/42
(58) Field of Search ................. 709/206, 207, 709/246, 247; 707/532; 379/100.08, 93.24; 714/20, 21, 26, 30, 39, 42

(56) References Cited

U.S. PATENT DOCUMENTS

| 4,924,514 | A | * | 5/1990 | Matyas et al. |
| 5,245,532 | A | * | 9/1993 | Mourier |
| 5,283,562 | A | * | 2/1994 | Gross et al. |
| 5,283,887 | A | * | 2/1994 | Zachery |
| 5,390,247 | A | * | 2/1995 | Fischer |
| 5,574,901 | A | * | 11/1996 | Takahashi |
| 5,606,609 | A | * | 2/1997 | Houser et al. |
| 5,608,874 | A | * | 3/1997 | Ogawa et al. |
| 5,613,108 | A | * | 3/1997 | Morikawa |
| 5,696,906 | A | * | 12/1997 | Peters et al. |
| 5,758,354 | A | * | 5/1998 | Huang et al. |
| 5,765,033 | A | * | 6/1998 | Miloslavsky ............... 709/206 |
| 5,781,901 | A | * | 7/1998 | Kuzma |
| 5,794,252 | A | * | 8/1998 | Bailey et al. |
| 5,799,318 | A | * | 8/1998 | Cardinal et al. |
| 5,799,323 | A | * | 8/1998 | Mosher, Jr. et al. |
| 5,813,009 | A | * | 9/1998 | Johnson et al. |
| 5,818,447 | A | * | 10/1998 | Wolf et al. |
| 5,822,527 | A | * | 10/1998 | Post ........................ 709/206 |

(List continued on next page.)

FOREIGN PATENT DOCUMENTS

JP          9-223052         8/1997

OTHER PUBLICATIONS

M. Kennedy, Summary of 1500–1599 (RFC1599), Jan. 1997, IP.com, pp. 1–3.*

Primary Examiner—Le Hien Luu
Assistant Examiner—Stephan Willett
(74) Attorney, Agent, or Firm—Staas & Halsey LLP

(57) ABSTRACT

Previous to the sending of an electronic mail, an attached file verifying unit retrieves a mail text to retrieve the presence or absence of an attachment representation indicative of the existence of an attached file, and if the attached representation has been retrieved, it issues for display a warning message urging the sender to verify the forget-to-attach. Furthermore, the attached file verifying unit compares the estimated number of attached files based on a number of attached files representation in the mail text with the actual number of attached files existing in the electronic mail, and if the actual number of the attached files is less than the estimated number of the attached files, it issues a warning message indicative of a lack of the attached files. In addition, the attached file verifying unit compares a file name in the mail text with a file name in the attached file, and if the two are not coincident with each other, it issues a warning message indicative of attachment of an erroneous file.

30 Claims, 28 Drawing Sheets

U.S. PATENT DOCUMENTS

| | | | | |
|---|---|---|---|---|
| 5,832,208 A | * | 11/1998 | Chen et al. | |
| 5,864,870 A | * | 1/1999 | Guck | |
| 5,870,548 A | * | 2/1999 | Mielson | 709/206 |
| 5,878,398 A | * | 3/1999 | Tokuda et al. | |
| 5,893,091 A | * | 4/1999 | Hunt et al. | |
| 5,903,723 A | * | 5/1999 | Beck et al. | |
| 5,907,680 A | * | 5/1999 | Nielson | |
| 5,917,489 A | * | 6/1999 | Thurlow et al. | |
| 5,920,848 A | * | 7/1999 | Schutzer et al. | |
| 5,923,846 A | * | 7/1999 | Gage et al. | |
| 5,938,725 A | * | 8/1999 | Hara | 709/206 |
| 5,978,566 A | * | 11/1999 | Plank et al. | 709/206 |
| 5,978,842 A | * | 11/1999 | Noble et al. | |
| 5,987,503 A | * | 11/1999 | Murakami | |
| 5,995,597 A | * | 11/1999 | Woltz et al. | 379/93.24 |
| 5,995,922 A | * | 11/1999 | Penteroudakis et al. | |
| 6,003,007 A | * | 12/1999 | DiRienzo | |
| 6,144,995 A | * | 11/2000 | Maya et al. | |
| 6,216,122 B1 | * | 4/2001 | Elson | |
| 6,243,092 B1 | * | 6/2001 | Okita et al. | |
| 6,275,809 B1 | * | 8/2001 | Tamaki et al. | |

* cited by examiner

FIG. 4

```
1   Received: from inetnif.niftyserve.or.jp (inetnif.niftyserve.or.jp [192.47.24.129]) by tcalsns.ka
    wa.tcals.or.jp (8.7.4/3.4W4-04/23/97) with ESMTP id EAA02880 for <siono@tcals.or.jp>; Thu, 25 De
    c 1997 04:19:57 +0900 (JST)
    Received: (from root@localhost) by inetnif.niftyserve.or.jp (8.8.4+2.7Wbeta4/3.5wpl1-970106) id
5   EAA22951; Thu, 25 Dec 1997 04:19:56 +0900 (JST)
    Message-Id: <199712241919.EAA22951@inetnif.niftyserve.or.jp>
    Date: Thu, 25 Dec 1997 02:20:00 +0900
    From: 塩野 拓 <HBG03017@niftyserve.or.jp>
    Subject: テキストのみです
10  To: siono@tcals.or.jp
    MIME-VERSION: 1.0
    Content-Type: text/plain; charset=iso-2022-jp
    X-UIDL: 0244873 5dfaba8062bae7d89d26bc08b
    Status: U
15  X-winbiff-flags: Seen

○○です。
    今回はこの文面のみです。
```

72 MAIL CONTROL STATEMENT

66 MAIL TEXT

IT'S ONLY TEXT.

THIS IS ○○.
IT'S ONLY THIS STATEMENT THIS TIME.

FIG. 5A

```
1    Received: from ms4.niftyserve.or.jp (ms4.niftyserve.or.jp [192.47.24.144]) by tca1sns.kawa.tcals
     .or.jp (8.7.4/3.4W4-04/23/97) with ESMTP id CAA02736 for <siono@tcals.or.jp>; Thu, 25 Dec 1997 0
     2:25:03 +0900 (JST)
     Received: (from root@localhost)
5              by ms4.niftyserve.or.jp (8.8.8+2.7Wbeta7/3.6Wbeta7-971204) id CAA02441;
               Thu, 25 Dec 1997 02:25:02 +0900 (JST)
     Message-Id: <199712241725.CAA02441@ms4.niftyserve.or.jp>
     From: 塩野 拓      <HBG03017@niftyserve.or.jp>
     To: siono@tcals.or.jp
10   Date: Thu, 25 Dec 1997 02:19:45 +0900
     Subject: Materials and photo
     MIME-Version: 1.0
     Content-Type: multipart/mixed; boundary="STAR DATE (-30)0448.56"
     X-Mailer: NIFTY MANAGER for Windows95 Version 4.50
15   X-UIDL: 375eceae8bbc40eb89b56a4627631656
     Status: U
     X-winbiff-flags: Seen

--STAR DATE (-30)0448.56
     ○○です。
20   先日お話しした資料をお送りします。
     ご査収ください。

チェックの結果はメールで結構です。
     よろしくお願いします。
     --STAR DATE (-30)0448.56
30   Content-Type: application/octet-stream; name="data.xls"
     Content-Transfer-Encoding: Base64
     Content-Disposition: attachment; filename="data.xls"
```

72 MAIL CONTROL STATEMENT 74-1

66 MAIL TEXT

THIS IS ○○.

I SEND YOU MATERIALS WHICH I TOLD YOU ABOUT THE OTHER DAY.
PLEASE CHECK AND RECEIVE THEM.

SEND RESULTS OF CHECK BY MAIL.
I WOULD LIKE YOU TO HANDLE THIS MATTER.

76

74-2

68 ATTACHED FILE

68 ATTACHED FILE

FIG. 5C

```
IAAAAAAAAOAEAAAAA9f8g9MAgAAAAAAAA4AAQAAAAAAD1/yDOwCAAAAAAADgABAAAAAA
APX/IPTAIAAAAAAAOAEAAAAAAA9f8g9MAgAAAAAAAA4AAQAAAAAAD1/yDOwCAAAAAAADg
AAAAAAAAAAAAAAAAAAAAAAAAAAAAAAAAAAAAAAAAAAAAAAAAAAAAAAAAAAAAAAAAAAAA
AAAAAAAAAAAAAAAAAAAAAAAAAAAAAAAAAAAAAAAAAAAAAAAAAAAAAAAAAAAAAAAAAAAA
AAAAAAAAAAAAAAAAAAAAAAAAAAAAAAAAAAAAAAAAAAAAAAAAAAAAAAAAAAAAAAAAAAAA
AAAAAAAAAAAAAAAAAAAAAAAAAAAAAAAAAAAAAAAAAAAAAAAAAAAAAAAAAAAAAAAAAAAA
AAAAAAAAAAAAAAAAAAAAAAAAAAAAAAAAAAAAAAAAAAAAAAAAAAAAAAAAAAAAAAAAAAAA
AAAAAAAAAAAAAAAAAAAAAAAAAAAAAAAAAAAAAAAAAAAAAAAAAAAAAAAAAAAAAAAAAAAA
AAAAAAAAAAAAAAAAAAAAAAAAAAAAAAAAAAAAAAAAAAAAAAAAAAAAAAAAAAAAAAAAAAEA
AAACAAAAAAwAAAAQAAAAF AAAABgAAAACAAAATAAAACQAAAAoAAAAL AAAA/v//wOAAAAOAAAA
AAAAABYAAAAXAAAAGAAAABkAAAAaAAAAGwAAAAP7
DwAABAAAAAR AAAAE gAAABMAAAD+/// FQAAABYAAABXAAAAGAAAAABgBOAHIAeQAAAEUAbgBOAHIAeQAAATAKgA
//9/////v/ /// /UgBvAG8AdAAgAEUAbgB0AHIAeQAAATARYABQH/////wIAAAAQCAIA
JAAEAAAAL QEDAAkkAAADB1EA8ABACQASAAAAQAASAAAAQCQAOF1+soOQvQH+///AAAAABQCbABCAG8BdwBrAAAA
AAAAMAAAAAABGAAAAACEA8ABABACQADAAAAAQAAAAQAAAATAQIABQAAAAQAAATAQIABQAAAAQAAATAn4A
JAAEAAAAL QEDAAK AAAADB1EA8ABABACQAbAAAAAQAAAAQAAAATAQIABQAAAAQAAATAQIABQAAAAQAAATAGAA
CGACAF/////yEA8AABACQAfgAAAAQAAAAQAAAATAQIABQBhAHIAQAAQBvAG4AAABvAG4BvAG1AaqQ1A
AADOFWAAL QEDAAUAUWB1AGOAbQBhAHIA eQBJAGOAAGOAAAAAAD/// / BQAAABQCTAAAAAAAIBAQAAAAMAAD
JAAEAAAAL QEDAAK AAAADB1EA8AAoAAIBAQAAAMAAAD////BQAAABQBEAG8AYwB1AAAATAQ1ABQAAADgAAgH--
JAAEAAAAL QEDAAK AAAADB1EA8AAoAAEADAAAAABABQBEAG8AYwB1AAAATAQ1ABQBvAHQAUwB1AGOA
//8EAAAAL QEDAAK AAAADB1EA8ABQAAAAQAQTAQIABQAUAAAAABAAAAUAAD=
--STAR DATE (-30)0448.56--
```

68 — ATTACHED FILE
78
74-3

FIG. 6

```
1   Received: from ms4.niftyserve.or.jp (ms4.niftyserve.or.jp [192.47.24.144]) by tcalsns.kawa.tcals
    .or.jp (8.7.4/3.4W4-04/23/97) with ESMTP id CAA02736 for <siono@tcals.or.jp>; Thu, 25 Dec 1997 0
    2:25:03 +0900 (JST)
    Received: (from root@localhost)
              by ms4.niftyserve.or.jp (8.8.8+2.7Wbeta7/3.6Wbeta7-971204) id CAA02441;
5             Thu, 25 Dec 1997 02:25:02 +0900 (JST)
    Message-Id: <199712241725.CAA02441@ms4.niftyserve.or.jp>
    From: 塩野 拓        <HBG03017@niftyserve.or.jp>
    To: siono@tcals.or.jp
    Date: Thu, 25 Dec 1997 02:19:45 +0900
10  Subject: Materials and photo
    MIME-Version: 1.0
    Content-Type: multipart/mixed; boundary="STAR DATE (-30)0448.56"
    X-Mailer: NIFTY MANAGER for Windows95 Version 4.50
    X-UIDL: 375eceae8bbc40eb89b56a4627631656
15  Status: U
    X-winbiff-flags: Seen

--STAR DATE (-30)0448.56
20  ○○です。

先日お話しした資料をお送りします。
    ご査収ください。

チェックの結果はメールで結構です。
    よろしくお願いします。
25  --STAR DATE (-30)0448.56
```

72 MAIL STATEMENT 74-1

66 MAIL TEXT 74-2

THIS IS ○○.

I SEND YOU MATERIALS WHICH I TOLD YOU ABOUT THE OTHER DAY. PLEASE CHECK AND RECEIVE THEM.

SEND RESULTS OF CHECK BY MAIL. I WOULD LIKE YOU TO HANDLE THIS MATTER.

FIG. 13A

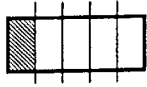

```
1   Received: from ms4.niftyserve.or.jp (ms4.niftyserve.or.jp [ms4.niftyserve.or.jp [192.47.24.144]) by tcalsns.kawa.tcals
    .or.jp (8.7.4/3.4W4-04/23/97) with ESMTP id CAA02738 for <siono@tcals.or.jp>; Thu, 25 Dec 1997 0
    2:25:03 +0900 (JST)
    Received: (from root@localhost)
        by ms4.niftyserve.or.jp (8.8.8+2.7Wbeta7/3.6Wbeta7-971204) id CAA02446;
5       Thu, 25 Dec 1997 02:25:03 +0900 (JST)
    Message-Id: <199712241725.CAA02446@ms4.niftyserve.or.jp>
    From: 塩野 拓           <HBG03017@niftyserve.or.jp>
    To: siono@tcals.or.jp
10  Date: Thu, 25 Dec 1997 02:19:58 +0900
    Subject: Materials and photo
    MIME-Version: 1.0
    Content-Type: multipart/mixed; boundary="STAR DATE (-30)0448.56"
    X-Mailer: NIFTY MANAGER for Windows95 Version 4.50
15  X-UIDL: bf425f8b4a85de3143bf6a56d91ed37b
    Status: U
    X-winbiff-flags: Seen --STAR DATE (-30)0448.56
20  Content-Type: Text/plain; charset=US-ASCII This is shun.

25  I send following 2files of attachment.

materials of the paper(data.xls)
        photograph data of convention(conv97.jpg)

Please give my best regard to your students.
30  --STAR DATE (-30)0448.56
    Content-type: application/octet-stream; name="data.xls"
    Content-Transfer-Encoding: Base64
    Content-Disposition: attachment; filename="data.xls"

35  0M8R4KGxGuEAAAAAAAAAAAAAAAAAAAAAAAPgADAP7/CQAGAAAAAAAAAAAAAAAABAAAAHQAAAAA
```

64 MAIL CONTROL STATEMENT 74-1
66 MAIL TEXT
74-2
76-1
68-1 ATTACHED FILE 78-1

68-1 ATTACHED FILE 68-1
ATTACHED FILE

FIG. 13D

```
AAAAAMAAAAAAAAAABGAAAAACEA8AABACQAoF1+soOQvQH+/////AAAAABQCbABCAG3AbwBrAAAA
JAAEAAAALQEDAAkAAAAdB1EA8AABACQAbAAAAAQAAAAtAQIABQAAABQCfgAAAAUAAAATAn4A
CgACAf/////yEA8AABACQAfgAAAAQAAAAQAAAAtAQIABQAAABQCkAAAAAUAAAATAgAA
AADOFwAALQEDAAUAUAUwB1AGOAbQBhAHIAeQBJAG4AdAAD/////BQAAABQCtAAAAAUAAAATAqQA
JAAEAAAALQEDAAkAAAAdB1EA8AAoAAIBAQAAAAMAAAD/////BQAAABQCtAAAAAUAAAATArQA
JAAEAAAALQEDAAkAAAAdB1EADAAAAAAQAAAAAAQABQBEAG8AYwB1AGOAZQBuAHQAUwB1AGOA
bQBhAHIAeAeQBJAG4AZgBvAHIAbQBhAHQAaQBvAG4AAADgAAgH///////8EAAAALQEDAAkAAAAdB1EA8AABACQA2AAAAAQAAAAAtAQIABQAUAAAABAAAAAAAD=
--STAR DATE (-30)0448.56
Content-type: image/jpeg; name="conv97.jpg"
Content-Transfer-Encoding: Base64
Content-Disposition: attachment; filename="conv97.jpg"

OM8R4KGxGuEAAAAAAAAAAAAAAAAAAAAAAPgADAP7/CQAgAAAAAUFAHOSygfhAAAAwQACAAAAvwAAAKQA
AAAAEAAA/v//wAAAD+/////AAAABWAAD/
BgABABAPAADAAAAA4gAAAFwANgAKAKiZaW7IFAJPWMY1AgICAgICAgICAgICAgICAg
ICAgICAgICAgICAgICBCAAIApaM9ASAAAABAAIAwAEAAUABgAHAAgACQAKAAsA
DAANAA4ADwDQAAIA/+CAAIADgAZAAIAAAASAAIAAAATAAIAAAA9ABIAAABLABC10RI4AAAA
AAAABAFgCQAACAAAAjQACAAAAIgACAAAADgACAAAEA2gACAAAAQATANwAAAD/f5ABAAAAAIAQ
BJa+kqkxxABMA3AABAP9/VAIAAAAAgBAE1r6SqTEAEWDcAAIA/3+QAQAAAACAEASWvpKpMQAT
ANwAAwD/f7wCAAAAAIAQBJa+kqkxxABMA3AAAAP9/kAEAAAAAgBAE1r6SqR4EFgFABMiXClj
LCMjMDs1XCJcLSMsIyMwHgoDbAAYAGCJCIiMsIyMwO1tSZWRdl1wiXCOjLCMjMB4EHAAHABK1
```

~68-1  
ATTACHED FILE

~74-3

~76-2

~68-2  
ATTACHED FILE

FIG. 14A

```
1   Received: from ms4.niftyserve.or.jp (ms4.niftyserve.or.jp [192.47.24.144]) by tcalsns.kawa.tcals
    .or.jp (8.7.4/3.4W4-04/23/97) with ESMTP id CAA02736 for <siono@tcals.or.jp>; Thu, 25 Dec 1997 0
    2:25:03 +0900 (JST)
    Received: (from root@localhost)
5       by ms4.niftyserve.or.jp (8.8.8+2.7Wbeta7/3.6Wbeta7-971204) id CAA02441;
        Thu, 25 Dec 1997 02:25:02 +0900 (JST)
    Message-Id: <199712241725.CAA02441@ms4.niftyserve.or.jp>
    From: 塩野 拓  <HBG03017@niftyserve.or.jp>
    To: siono@tcals.or.jp
10  Date: Thu, 25 Dec 1997 02:19:45 +0900
    Subject: Materials and photo
    MIME-Version: 1.0
    Content-Type: multipart/mixed; boundary="STAR DATE"
    X-Mailer: NIFTY MANAGER for Windows95 Version 4.50
15  X-UIDL: 375eceae8bbc40eb89b56a4627631656
    Status: U
    X-winbiff-flags: Seen --STAR DATE (-30)0448.56
20  Content-Type: Text/plain; charset=US-ASCII This is shun.

25  I send following 2files of attachment.

materials of the paper(data.xls)
        photograph data of convention(conv97.jpg)

Please give my best regard to your students.
30  --STAR DATE (-30)0448.56
    Content-type: application/octet-stream; name="data.xls"
    Content-Transfer-Encoding: Base64
    Content-Disposition: attachment; filename="data.xls"

35  OM8R4KGxGuEAAAAAAAAAAAAAAAAAAAAAPgADAP7/CQAGAAAAAAAAAAAAAAAAAAAABAAAAHQAAAAA
```

64 MAIL CONTROL STATEMENT 74-1

66 MAIL TEXT 74-2

68-1 ATTACHED FILE 76-1

68-1 ATTACHED FILE 78-1

FIG. 18A
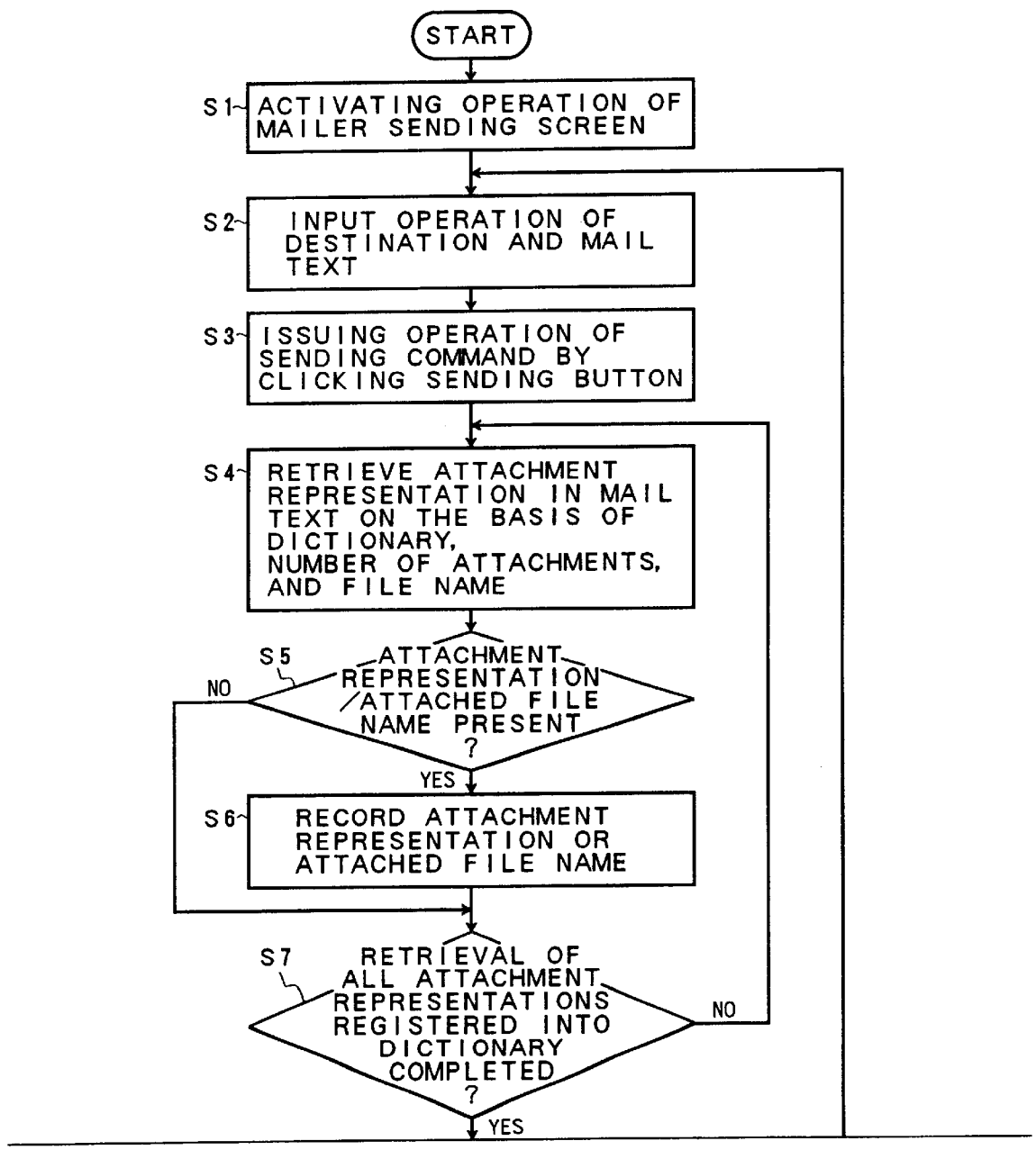

FIG. 18B
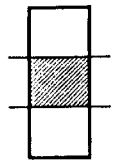
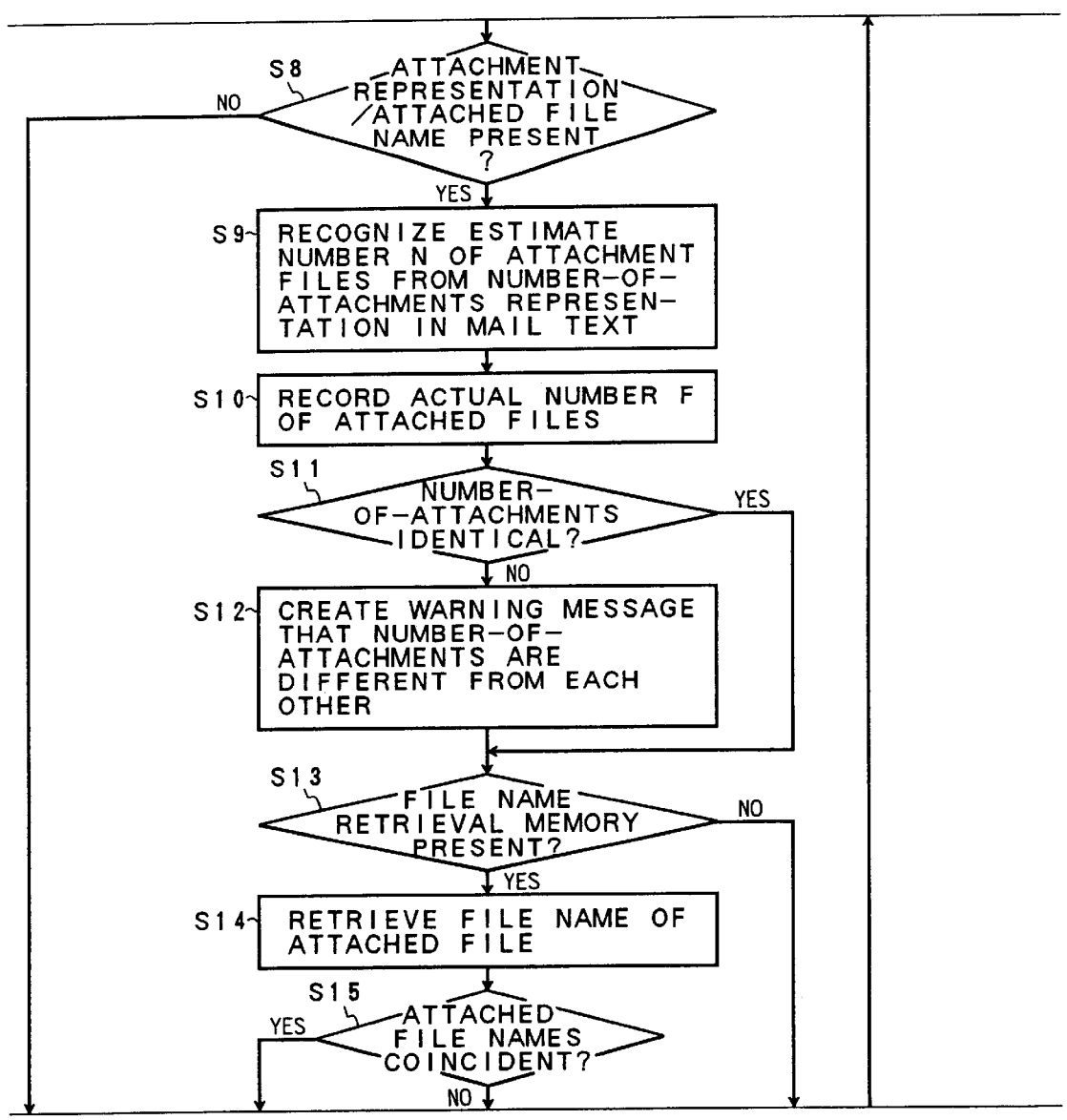

FIG. 18C
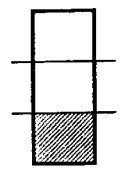
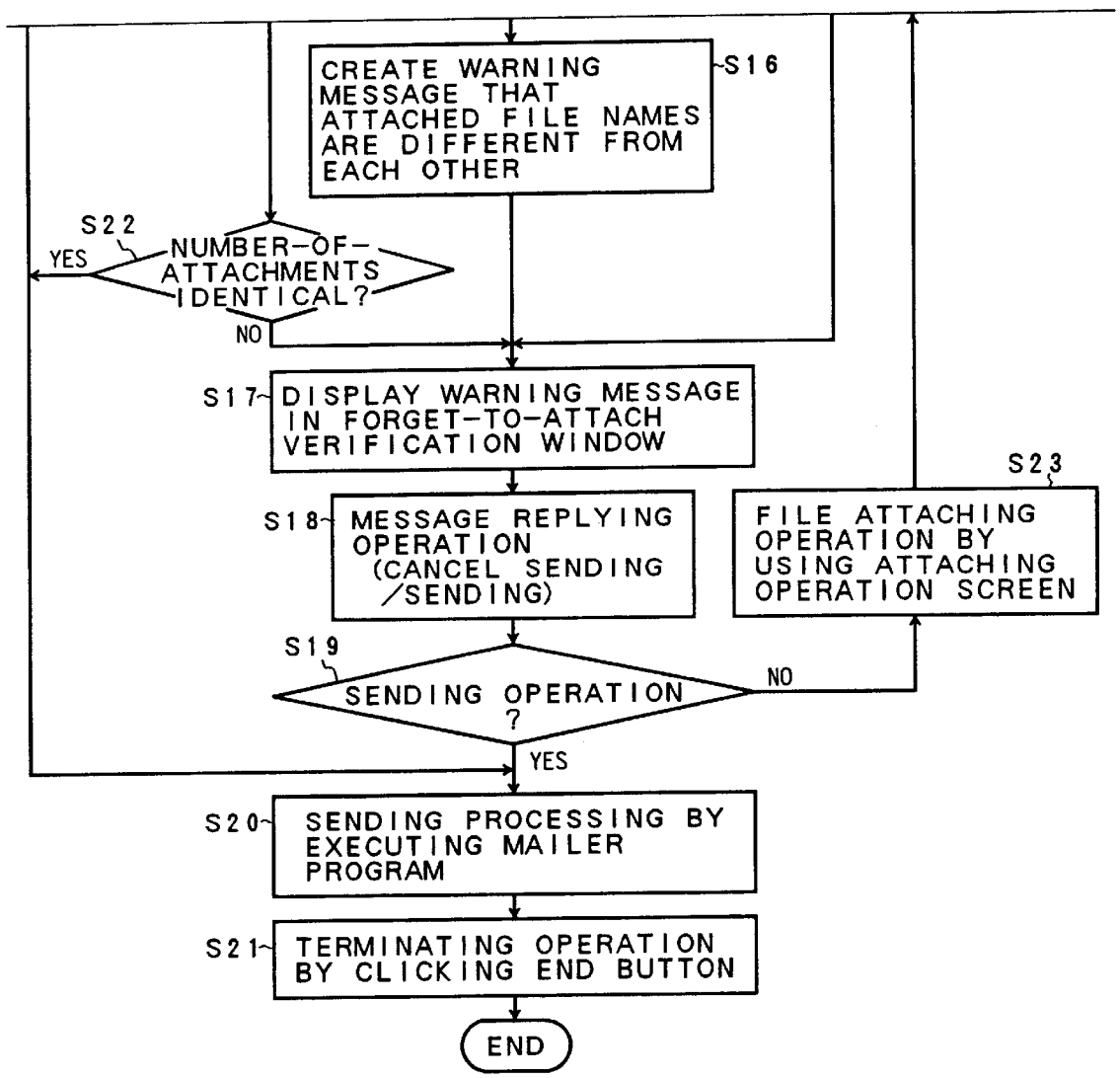

ELECTRONIC MAIL APPARATUS AND COMPUTER READABLE RECORD MEDIUM HAVING ELECTRONIC MAIL PROGRAM RECORDED THEREON

BACKGROUND OF THE INVENTION

1. Field of the Invention

The present invention relates generally to an electronic mail apparatus for sending an electronic mail created with character codes in text format and a computer readable record medium on which is recorded an electronic mail program, and more particularly to an electronic mail apparatus for sending an electronic having binary format files attached to a text format mail document and a computer readable record medium on which is recorded the electronic mail program.

2. Description of the Related Art

In a conventional electronic mail apparatus, a text of an electronic mail is described with character codes in text format, and binary format file data such as diagrams and images incapable of being represented in the text format are intended to be attached to the mail text without changing the file format and without incorporating into the mail text for sending. In the case of attaching files to the mail text in this manner, typically a description indicative of attachment of files is made in the mail text after which the files are attached thereto for sending.

In the electronic mail sending operation, however, the sender may often forget to perform a file attachment operation at the stage of the sending operation after the completion of a document in spite of the initial intention to attach files later in the process of describing the mail text. In order to obviate this problem of forgetting to attach files, it is conceived to fixedly impart to the operator a message urging the sender to verify the attached files upon the sending. In the method of fixedly issuing the verifying message, however, a verifying message is always issued irrespective of the presence or absence of the attached files, which will be an eyesore to the operator. For this reason, the sender may habitually stop or ignore the message function, with the result that the sender may often forget to perform the file attachment operation.

In case the sender has forgotten to attach files in an electronic mail in this manner, the receiver side is actually incapable of receiving the files in spite of the indication of the attachment of files in the mail text. As a result, the receiver has to contact the sender side to troublesomely ask the sender to resend the electronic mail with attached files. A smooth exchange of the electronic mail is thus impaired. Furthermore, if the sender is unaware of the forgetting to attach files with his/her misunderstanding of having attached files, the business utilizing the electronic mails may be delayed to adversely affect the execution of the business. Furthermore, even though the file attaching operation has been performed upon the sending, the number of files to be attached may be short or different files may be erroneously attached. In these cases also, a smooth exchange of electronic mails is impaired, resulting in a significant trouble in the business.

SUMMARY OF THE INVENTION

According to the present invention, there are provided an electronic mail apparatus and an electronic mail processing method capable of previously preventing in the case of sending an electronic mail with files the forgetting to attach files, a lack of files to be attached, a difference in the content of files to be attached and ensuring smooth and secure exchange of electronic mails, as well as a computer readable record medium on which an electronic mail program is recorded.

In the electronic mail apparatus of the present invention, a mail creating unit creates an electronic mail which has a mail control statement and a mail text described in text format and if necessary has files attached thereto and incapable of being represented in the text format, and a mail sending unit sends an electronic mail created by the mail creating unit. The present invention is characterized in that for such an electronic mail apparatus, an attached file verifying unit is provided which, previous to the sending of an electronic mail, retrieves the mail text to retrieve the presence or absence of attachment representations indicative of the existence of attached files and which, if the attachment representations have been retrieved, issues for display a warning message urging the sender to verify the forgetting to attach files. According to the present invention, a check is made to see if the mail text contains an attachment representation indicative of the presence of the attached files, and if absent, the sender is urged to verify the forget-to-attach so that the sender can judge whether the file attaching operation is needed or not upon the sending. If needed the attachment can be effected, whereas if unneeded the sending can be effected with disregard, whereby it is possible to perform smooth electronic mail sending processing which appropriately reflects the content of the mail and the sender's will in accordance with the situations.

In this case, the attached file verifying unit performs the forget-to-attach verification processing when an electronic mail sending button is clicked. The attached file verifying unit includes a dictionary registering unit for previously registering attachment representations existing in the mail text into a dictionary; an attached file judging unit which, previous to the sending of an electronic mail, judges the presence or absence of the attached files; an attachment representation retrieving unit which, when the attached file judging unit has judged no attached files, retrieves a character string in the mail text coincident with the attachment representations registered into the dictionary; and a warning message output unit which, when the attachment representation retrieving unit has retrieved the attachment representations, creates for display a message urging the sender to verify the forgetting to attach files. The attached file judging unit judges the presence or absence of attached files on the basis of boundary information associated with the mail text and the attached files of the electronic mail. More specifically, the attached file judging unit detects the number B of boundaries on the basis of boundary information associated with the mail text and attached files and judges the presence of attached files if a value obtained by subtracting 2 from the number B of boundaries is equal to or larger than 1. For example, in cases where the number B of files is three, the number F of boundaries results in 5 which is larger than it by 2.

The number B of files=the number F of boundaries−2= 5−2=3 which is larger than 1, making it possible to judge the presence of any attached files.

According to another aspect of the present invention, the attached file verifying unit includes a dictionary registering unit for previously registering into a dictionary both attachment representations in the mail text indicative of the existence of the attached files and number of attached files representations in the mail text indicative of the number of attached files; an attachment representation retrieving unit which retrieves character strings in the mail text coincident with attachment representations and number of attached files representations registered in the dictionary and which retrieves character strings indicative of attached file names; a number of attached files verifying unit which, when the presence of attached files has been judged from the result of retrieval of the attachment representation retrieving unit, compares the estimated number of attached files based on the number of attached files representations in the mail text with the actual number of attached files existing in the electronic mail and which, if the actual number of attached files is less than the estimated number of attached files, creates a warning message indicative of a lack of attached files; and a warning message output unit for issuing for display the warning message created by the number of attached files verifying unit. Thus, in addition to the forgetting to attach files, a lack of attached files when the files have been attached can be judged to urge the sender to verify it. In this case, the attached file verifying unit performs verification processing of the number of attached files when an electronic mail sending button is clicked. The attached file verifying unit includes a dictionary registering unit for previously registering into a dictionary both attachment representations in the mail text indicative of the existence of the attached files and number of attached files representations in the mail text indicative of the number of attached files; an attachment representation retrieving unit which retrieves character strings in the mail text coincident with attachment representations and number of attached files representations registered in the dictionary and which retrieves character strings indicative of attached file names; an attached content verifying unit which, when an attached file name has been retrieved by the attachment representation retrieving unit, compares the file name with a file name in attached files and which, if the two are not coincident with each other, creates a warning message indicative of attachment of an erroneous file; and a warning message output unit for issuing for display the warning message created by the attached content verifying unit. Thus, in addition to the forgetting to attach files, attachment of erroneous files when files have been attached can be judged to urge the sender to verify it. In this case as well, the attached file verifying unit performs verification processing of attached file names when an electronic mail sending button is clicked. The number of attached files verifying unit judges the actual number of attached files on the basis of each boundary information associated with the mail text and attached files of the electronic mail. More specifically, the number of attached files judging unit detects the number B of boundaries on the basis of boundary information associated with the mail text and attached files and defines as the actual number F of attached files a value obtained by subtracting 2 from the detected number B of boundaries. The attachment representation registering unit registers as the attachment representations character strings representing "attached", "attachment", "enclosure", etc., in a language used in the mail text into the dictionary. It further registers as the number of attached files representations sets of character strings representing the number of attached files such as "a file", "files", etc., and values of the number of attached files. That is, registered are for instance a set "a file, 1" of a character string "a file" and the number of attached files "1", a set "files, *" of a character string "files" and the value "*" of the number of attached files. Besides, "*" denotes an arbitrary integer equal to or larger than 2.

The present invention further provides a computer readable record medium on which is recorded an electronic mail program comprising a mail creating unit for creating an electronic mail which has a mail control statement and a mail text described in text format and if necessary has files attached thereto and incapable of being represented in the text format; a mail sending unit for sending an electronic mail created by the mail creating unit; and an attached file verifying unit which, previous to the sending of an electronic mail, retrieves the mail text to retrieve the presence or absence of attachment representations indicative of the existence of attached files and which, if the attachment representations have been retrieved, issues for display a warning message urging the sender to verify the forgetting to attach files. In this case, the attached file verifying unit includes a dictionary registering unit for previously registering attachment representations existing in the mail text into a dictionary; an attached file judging unit which, previous to the sending of an electronic mail, judges the presence or absence of the attached files; an attachment representation retrieving unit which, when the attached file judging unit has judged no attached files, retrieves a character string in the mail text coincident with the attachment representations registered into the dictionary; and a warning message output unit which, when the attachment representation retrieving unit has retrieved the attachment representations, creates for display a message urging the sender to verify the forgetting to attach files. The attached file verifying unit includes a dictionary registering unit for previously registering into a dictionary both attachment representations in the mail text indicative of the existence of the attached files and number of attached files representations in the mail text indicative of the number of attached files; an attachment representation retrieving unit which retrieves character strings in the mail text coincident with attachment representations and number of attached files representations registered in the dictionary and which retrieves character strings indicative of attached file names; a number of attached files verifying unit which, when the presence of attached files has been judged from the result of retrieval of the attachment representation retrieving unit, compares the estimated number of attached files based on the number of attached files representations in the mail text with the actual number of attached files existing in the electronic mail and which, if the actual number of attached files is less than the estimated number of attached files, creates a warning message indicative of a lack of attached files; and a warning message output unit for issuing for display the warning message created by the number of attached files verifying unit. Furthermore, the attached file verifying unit includes a dictionary registering unit for previously registering into a dictionary both attachment representations in the mail text indicative of the existence of the attached files and number of attached files representations in the mail text indicative of the number of attached files; an attachment representation retrieving unit which retrieves character strings in the mail text coincident with attachment representations and number of attached files representations registered in the dictionary and which retrieves character strings indicative of attached file names; an attached content verifying unit which, when an attached file name has been retrieved by the attachment representation retrieving unit, compares the file name with a file name in attached files and which, if the two are not coincident with each other, creates a warning message indicative of attachment of an erroneous file; and a warning message output unit for issuing for display the warning message created by the attached content verifying unit. The details of the other aspects than these are basically the same as the electronic mail apparatus.

The above and other objects, features, and advantages of the present invention will become more apparent from the following detailed description with reference to the accompanying drawings.

BRIEF DESCRIPTION OF THE DRAWINGS

FIG. 4 is a diagram showing a data structure of a Japanese electronic mail with no attached files;

FIGS. 5A to 5C are diagrams showing a data structure of a Japanese electronic mail with files properly attached;

FIG. 6 is a diagram showing a data structure of a Japanese electronic mail in cases where the sender has forgotten to attach files;

FIGS. 13A to 13E are diagrams showing a data structure of a Japanese electronic mail with files properly attached;

FIGS. 14A to 14C are diagrams showing a data structure of a Japanese electronic mail in cases where the sender has forgotten to attach one of the files;

FIGS. 18A to 18C are flowcharts of electronic mail processing of FIG. 11.

DETAILED DESCRIPTION OF THE PREFERRED EMBODIMENTS

Processing for Verifying Whether Sender Has Forgotten Attachment of File

Figure 1:
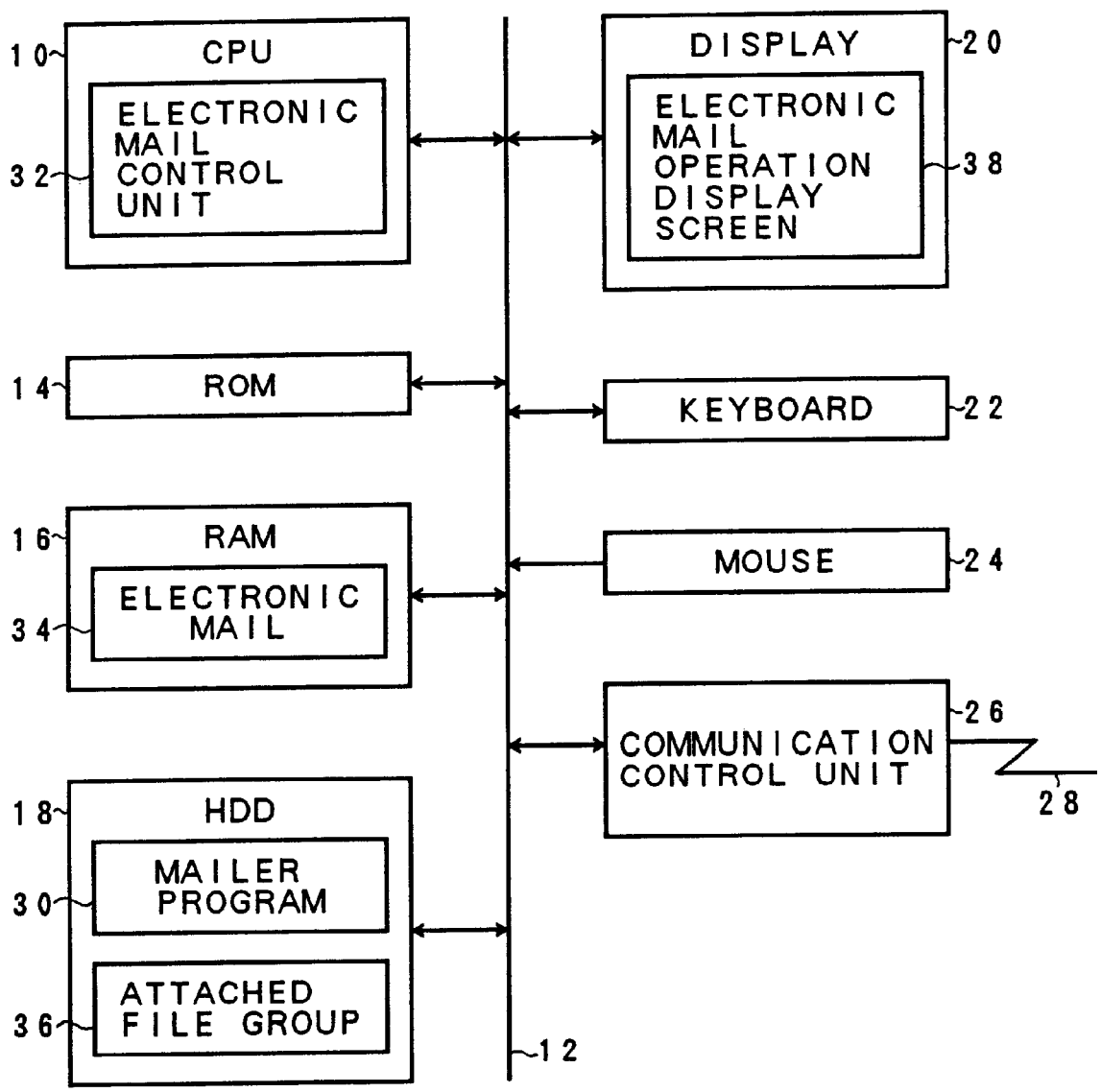
FIG. 1 is a block diagram of a hardware configuration of an electronic mail apparatus of the present invention.

FIG. 1 is a block diagram showing a hardware configuration of a personal computer by way of example to which is applied an electronic mail apparatus in accordance with the present invention. The personal computer implementing the electronic mail apparatus of the present invention comprises a CPU 10 having a bus 12, to which are connected a ROM 14, a RAM 16, a hard disk drive (HDD) 18, a display 20, a keyboard 22, a mouse 24 and a communication control unit 26. The hard disk drive 18 stores therein a mailer program 30 for implementing functions of the mail apparatus of the present invention. Through selection of an electronic mail by use of a menu screen of the display 20, the mailer program 30 of the HDD 18 is loaded into the RAM 16 serving as a main storage. Through execution of the mailer program 30 by the CPU, the function of the electronic mail control unit 32 included in the CPU 10 is implemented while simultaneously allowing an electronic mail operation display screen 38 to appear on the display 20. For this reason, the sender makes use of the electronic mail operation display screen 38 on the display 20 to enter, at the time of sending of an electronic mail for instance, mail control information such as a destination and a title and to create a mail text using character codes in text format. An electronic mail 34 created in this manner is stored in the RAM 16 and, through sending operation using the electronic mail operation display screen 38, is sent to a communication circuit 28 such as a LAN in conformity with a predetermined communication protocol by means of the communication control unit 26. The electronic mail control unit 32 is equipped with an electronic mail receiving function as well. When the communication control unit 26 receives an electronic mail, the electronic mail control unit 32 stores the electronic mail 34 received in the RAM 16 and uses the electronic mail operation display screen 38 on the display 20 upon the activation of the mailer program 30 to read out the received electronic mail for deployment on the display 20. In the case of the electronic mail 34 created by use of the electronic operation display screen 38 on the display 20, a mail control statement and a mail text are described with character codes in the text format, whereas data of diagrams, tables, images, etc., in the binary format other than the text format are attached to the mail text for sending intactly without being deployed into the mail text in the text format. For this reason, an attachment file attached to the mail text is prepared as for example an attachment file group 36 in the hard disk drive 18 so that it can be sent including the electronic mail 34 by executing the file attachment operation by means of the electronic mail operation display screen 38 after the creation of the mail text.

Figure 2:
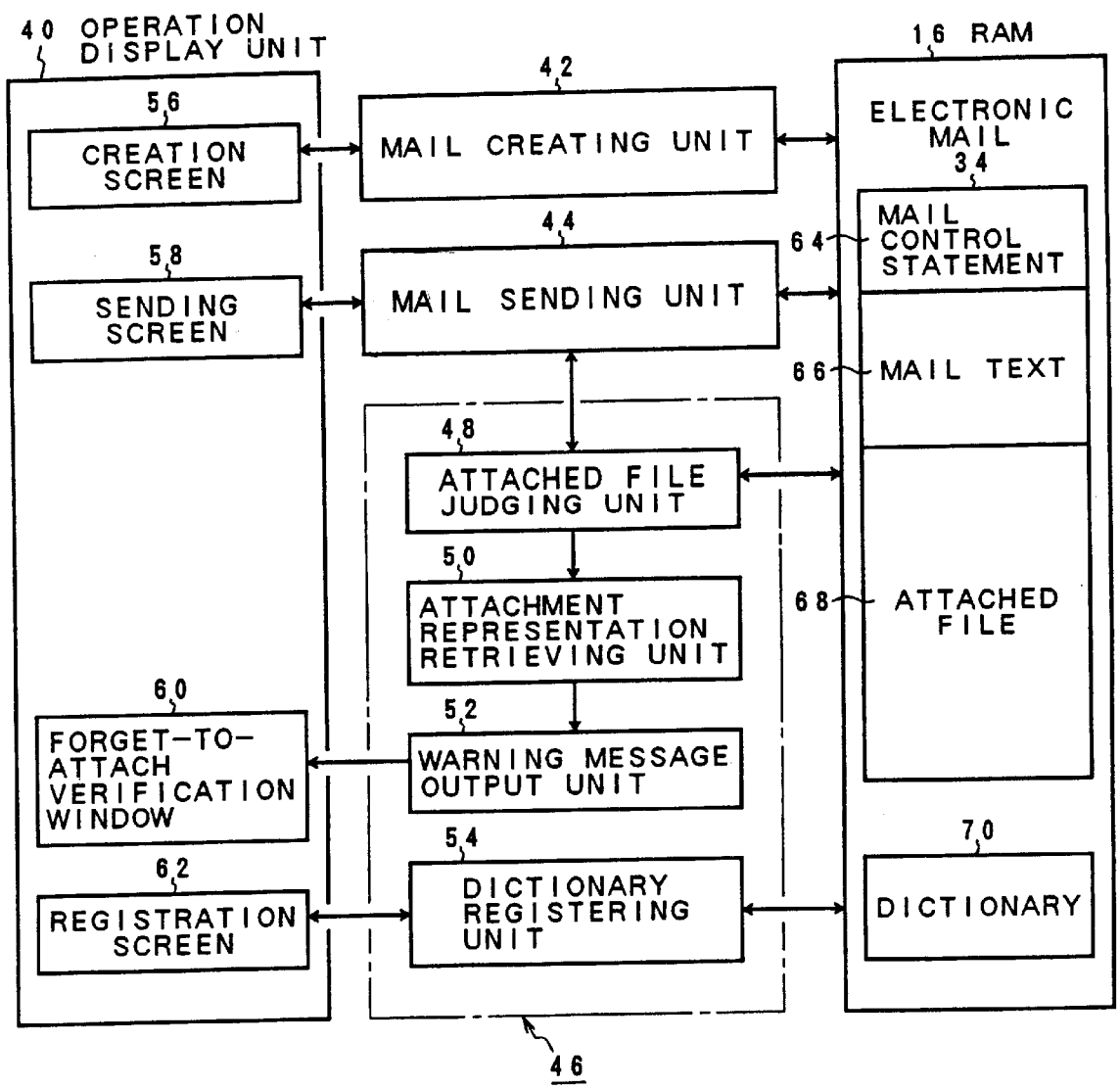
FIG. 2 is a function block diagram of a first embodiment of the present invention.

FIG. 2 is a function block diagram of a first embodiment of an electronic mail apparatus of the present invention implemented by the execution of the mailer program 30 of FIG. 1 by use of the CPU 32. This embodiment is characterized in that it can automatically be verified upon the sending whether the sender has forgotten to attach a file to the mail text of the electronic mail. The electronic mail apparatus of this embodiment comprises a mail creating unit 42, a mail sending unit 44 and an attached file verifying unit 46. Using a creation screen 56 and a sending screen 58 of an operation display unit 40 implemented by the display 20, the keyboard 22 and the mouse 24 of FIG. 1, the mail creating unit 42 is capable of performing a creation of an electronic mail text and a file attachment operation. Through the creation processing by this mail creating unit 42, an electronic mail 34 is deployed on the RAM 16. The electronic mail 34 consists of a mail control statement 64 and a mail text 66, and if needed an attached file 68.

Figure 3:
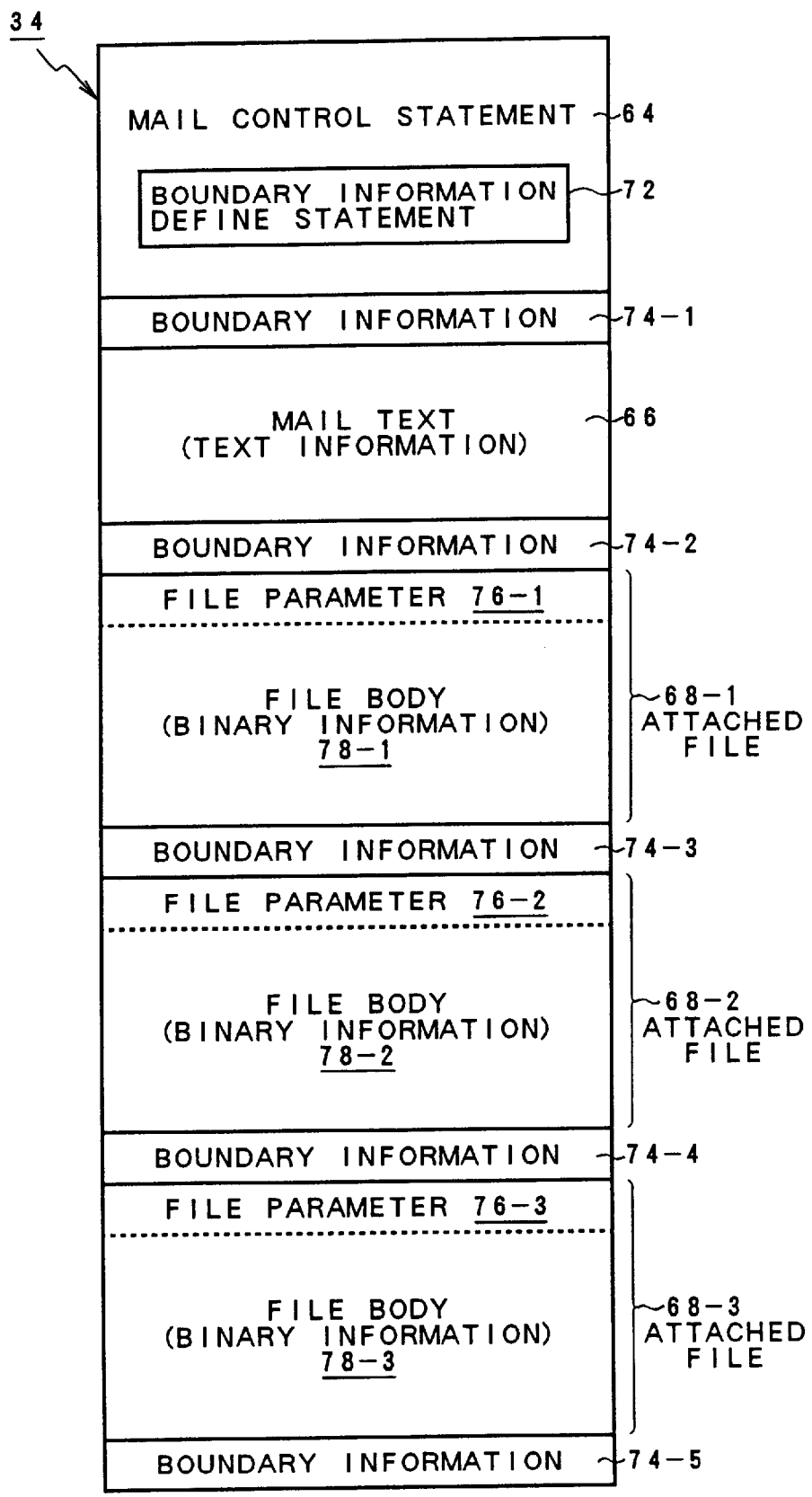
FIG. 3 is an explanatory diagram of a data structure of an electronic mail which is the subject of the present invention.

FIG. 3 illustrates a data structure of the electronic mail 34 stored in the RAM 16 of FIG. 2. The electronic mail 34 consists basically of the mail control statement 64 and the mail text 66, with the addition of the attachment file if necessary. This data structure includes by way of example three attached files 68-1, 68-2 and 68-3. This electronic mail 34 consists basically of the mail control statement 64 and the mail text 66, and an specific example of no attached files is shown in FIG. 4 for instance.

An electronic mail data structure of FIG. 4 is divided into the leading mail control statement 64 and the following mail text 66. The mail control statement 64 includes mail control information such as a sender address, a sending time, a message ID, a sender name and a destination. The mail text 66 consists of a Japanese character code string in the text format, and in this example represents that there is no attachment file.

Referring again to FIG. 3, the mail control sentence 64 includes a boundary information define statement 72 in the case of adding the attached files 68-1 to 68-3 following the mail text 66. In cases where the boundary information define statement 72 is provided in the mail control statement 64, boundary information 74-1, 74-2, 74-3, 74-4 and 74-5 is interposed at boundary positions of the mail text 66 and the attached files 68-1 to 68-3. For this reason, by recognizing the boundary information from the boundary information define statement 72 provided in the mail control statement 64 of the electronic mail 34, it is possible to retrieve the boundary information 74-1 to 74-5 associated with the mail text 66 and the attached files 68-1 to 68-3. The present invention uses this boundary information 74-1 to 74-5 to judge whether the electronic mail 34 includes the attached files 68-1 to 68-3. That is, the boundary information 74-1 to 74-5 is provided at the start position of the mail text 66, the boundary positions between the mail text 66 and the attached files 68-1 to 68-3, and the terminal position of the last attached file 68-3, with the result that $$F=B-2 \quad (1)$$

is established where B is the number of the boundary information and F is the number of the attached files.

Thus, the number F of the attached files can be obtained by retrieving the electronic mail 34 on the basis of the boundary information derived from the boundary information define statement 72 to obtain the number B of the boundary information and by subtracting 2 from the number B of the boundary information using the expression (1). Since B is equal to 5 in the case of FIG. 3, the number F of the attached files can be given as $$F=5-2=3$$

Figure 5B:

FIGS. 5A to 5C are specific examples of a data structure with attachment file of the electronic mail 34 of FIG. 3, and in this case the number of the attachment file is one. First, the leading portion of FIG. 5A is a mail control statement 64. At the second paragraph on the 13th line of the mail control statement 64, there is described "boundary='STAR DATE (−30)0448.56''" as the boundary information define statement 72 shown in FIG. 3". "STAR DATE(−30)0448.56" of this boundary information define statement "boundary= 'STAR DATE (−30)0448.56''" is the boundary information and is used as the boundary information 74-1 to 74-5 associated with the mail text 66 and the attached files 68-1 to 68-3 as in FIG. 3. In the case of the electronic mail of FIGS. 5A to 5C, a single attached file 68 is added to the mail text 66. "STAR DATE(−30)0448.56" is provided at the leading position of the mail text 66 as the boundary information 74-1. The second boundary information 74-2 is provided between the mail text 66 and the attached file 68, and the third boundary information 74-3 is provided at the terminal end of the attached file 68 of FIG. 6A. The mail text 66 is in the form of a message stating that an attached file 68 is sent.

Referring again to FIG. 3, the attached files 68-1 to 68-3 following the mail text 66 are made up respectively of file parameters 76-1, 76-2, 76-3 at the leading portions described in the text format and file bodies 78-1, 78-2, 78-3 described in the binary format. Taking the case of the data structure of the electronic mail having a single attached file 68 added thereto of FIGS. 5A to 5C for instance, the leading portion of the attached file 68 has a description in the text format as the file parameter 76 which includes descriptions on the format "Content-Type" of the attached file 68, the data compression format "Content-Transfer-Encoding" of the file body 78 and the nature of content "Content-Disposition" such as attachment and file names. The file body 78 following the file parameter 76 is constituted of data in the binary format other than the text format, which are thoroughly meaningless data as the character codes in the text format.

FIG. 6 illustrates a specific data structure of an electronic mail in cases where the sender has forgotten an attachment operation for attaching the attached file 68 to the electronic mail of FIGS. 5A to 5C. In this case, posterior to the second boundary information 74-2 following the mail text 66 there are no data on the attached file 68 of FIGS. 5A to 5C.

Referring back to FIG. 2, the attached file verifying unit 46 is provided with an attached file judging unit 48, an attachment representation retrieving unit 50, a warning message output unit 52 and a dictionary registering unit 54. Upon the issue of a sending command, that is, when after the creation of the electronic mail 34 on the RAM 16 by the mail creating unit 42, the mail sending unit 44 is instructed to perform a sending operation by use of the sending screen 58 of the operation display unit 40, this attached file verifying unit 46 is activated and automatically retrieves an attachment representation indicative of the presence or absence of the attached file 68 within the mail text 66. As a result of this retrieval, in case there actually exists no attached file 68 in spite of the existence of the attachment representation indicative of the presence of the attached file 68 within the main text 66, a warning message is issued which urges the sender to perform an attachment operation of the attached file 68. In order to implement such a forget-to-attach verification by the attached file verifying unit 46, the dictionary registering unit 54 is used to previously register through a registration screen 62 into a dictionary 70 an attachment representation indicative of the presence of an attached file 68 to be used in the attachment representation retrieving unit 50.

Figure 7:
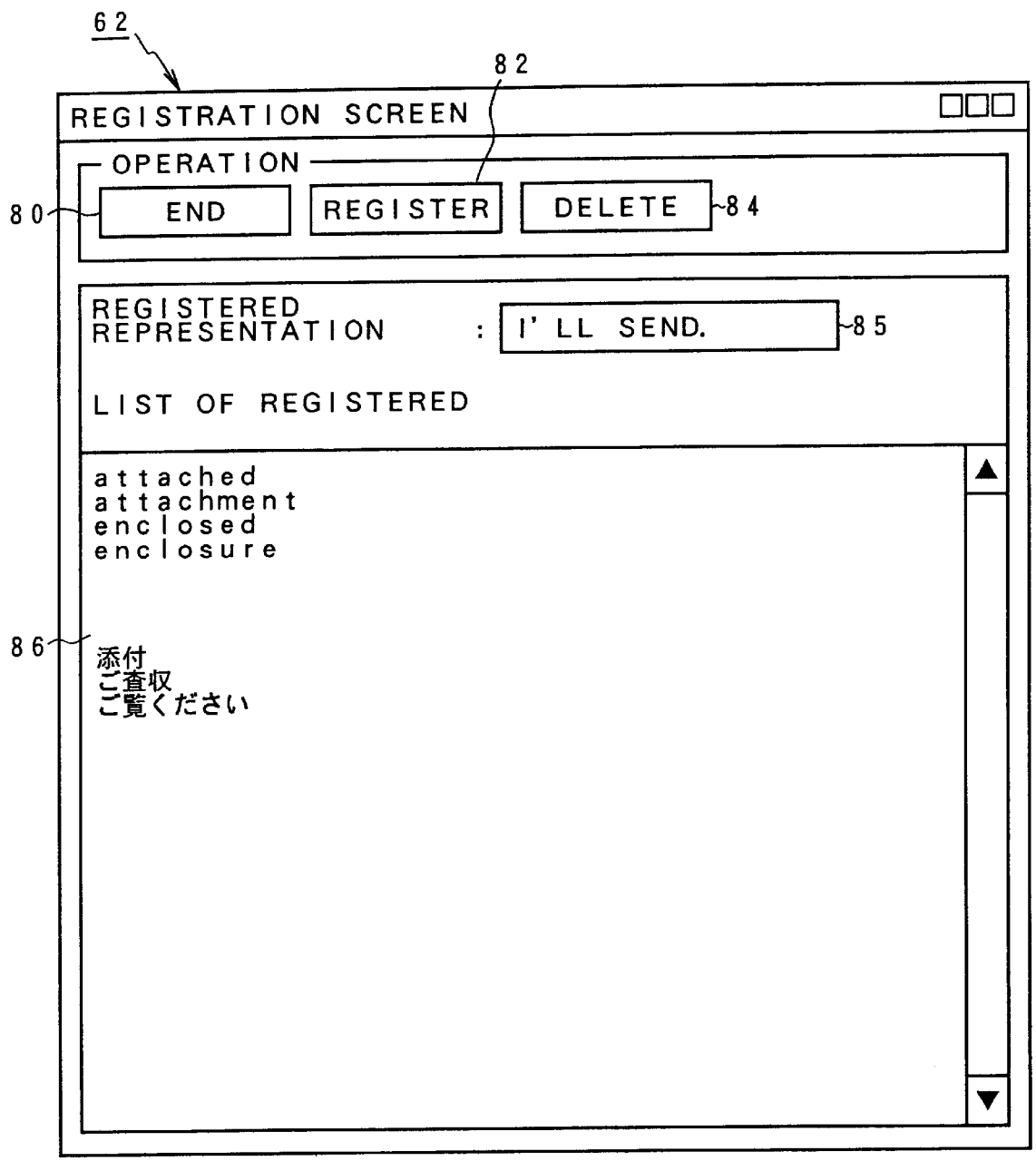
FIG. 7 is an explanatory diagram of a registration screen for use in the dictionary registration in FIG. 2.

FIG. 7 illustrates a specific example of the registration screen 62 for use by the dictionary registering unit 54 of FIG. 2. The registration screen 62 is provided with an end button 80, a register button 82 and a delete button 84 as operation buttons, below which is disposed a registered representation input frame 85 for describing an attachment representation to be registered into the dictionary, below which is provided a register list 86 indicating the dictionary registered. In cases where the mail text is Japanese, the registration screen 62 registers therein as the attachment representation, 「添付」(attached), 「ご査収」(offer) and 「ご覧下さい」(refer) for instance. In cases where the mail text is English, registered as the attachment representation are "attached", "attachment" "enclosed" and "enclosure". It is natural that the attachment representation registered in the dictionary 70 be not limited to the content of the register list 86 of FIG. 7 and that appropriate attachment representation expected to appear in the mail text be previously registered into the dictionary 70.

Figure 8:
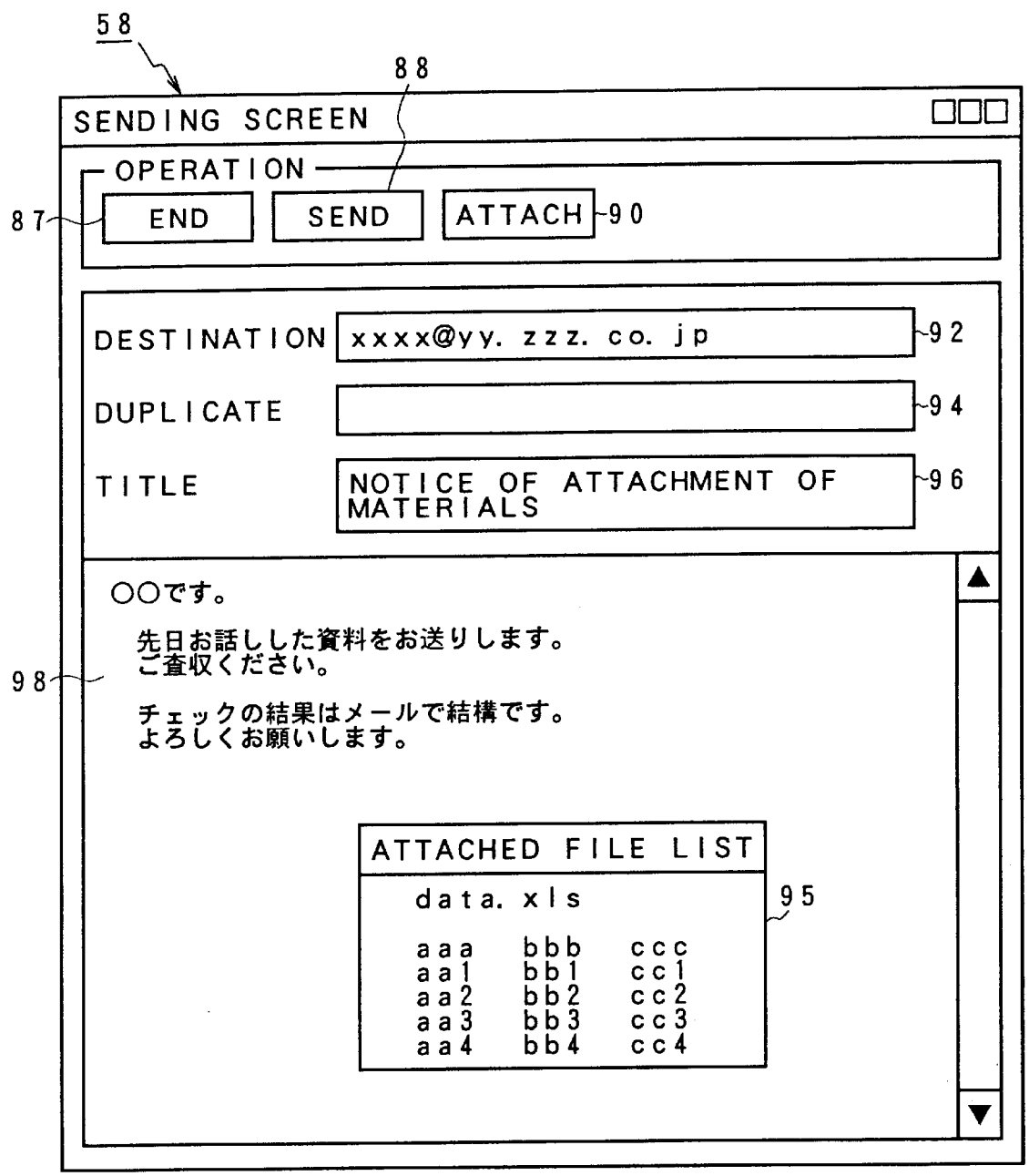
FIG. 8 is an explanatory diagram of a sending screen for use in the sending in FIG. 2.

FIG. 8 illustrates a specific example of the sending screen 58 for use in the processing of the mail sending unit 44 of FIG. 2. This sending screen 58 is provided with an end button 87, a send button 88 and an attach button 90 as the operation buttons. Posterior to these, there are disposed a destination input frame 92, a duplicate input frame 94 and a title input frame 96, below which is provided a mail screen 98 displaying an input Japanese mail text. Such a Japanese mail text as shown is created on this mail screen 98. It is to be noted that an English translation of the Japanese mail text is shown in parentheses. After the creation of the Japanese mail text, the sender pushes the attach button 90 to open an attached file list widow 95 and selects a required file list name from among file names "data. xls" to be attached, thereby performing the attachment. Upon the sending after the completion of creation of an electronic mail, the send button 58 on the sending screen 58 is clicked with the mouse. Through this mouse click, a sending instruction (sending command issue) is given to the mail sending unit 44 of FIG. 2, allowing the attached file verifying unit 46 to execute verifying processing of the forget-to-attach on the basis of this sending instruction. First, the attached file judging unit 48 judges whether an attached file is present or not from the data structure of the electronic mail 34 shown in FIG. 3. For this judgment of the presence or absence of the attached file, the boundary information define statement 72 is recognized from the mail control statement 64 to obtain the boundary information, and the number B of the boundary information contained in the electronic mail 34 is obtained with the boundary information as the keyword. The result is placed into the expression (1) to subtract 2 therefrom to obtain the number F of the attached files. If the number F of the attached files is equal to zero, no attached file is judged, whereas if F is equal to or more than 1, the presence of the attached file is judged. In cases where the attached file judging unit 48 has judged the presence of the attached file, it is judged that no attached file 68 has been forgotten to attach, allowing the mail sending unit 44 to execute the sending processing of the electronic mail 34. In this manner, the judgment of the presence of the attached file by the attached file judging unit 48 occurs when the attached file 68 is properly attached to the mail text 66 as in the data structure of the electronic mail of FIGS. 5A to 5C. On the contrary, in cases where no attached file has been judged by the attached file judging unit 48, the attachment representation retrieving unit 50 is operated. The judgment of no attached file by the attached file judging unit 48 occurs when the electronic mail has originally no attached file attached thereto as in FIG. 4, or when the electronic mail has no attached file because the attachment of the file has been forgotten as in FIG. 6. The attachment representation retrieving unit 50 retrieves the mail text 66 using as the keyword the attachment representation registered in the dictionary 70, for instance, the attachment representation shown in the register list 86 of FIG. 7. For instance, when the mail text 66 of FIG. 4 is subjected to the. attachment representation retrieving processing, there is obtained a retrieval result of no attachment representation since this mail text 66 contains no character string corresponding to the attachment representation registered in the dictionary. In cases where the retrieval result of no attachment representation has been obtained, this electronic mail need not have attachment files, so that the processing is passed to the mail sending unit 44 to execute the sending processing of the electronic mail 34 consisting only of the mail control statement 64 and the mail text 66. On the other hand, when the mail text 66 of FIG. 6 is subjected to the attachment representation retrieval processing, obtained as the retrieval result is a character string coincident with the attachment representation 「ご査収」(offer) registered in the dictionary, so that it is judged that the attachment of the file has been forgotten from this attachment representation retrieval result. In cases where it has been judged that the file has been forgotten to attach, the warning message output unit 52 generates a warning message indicating that the attachment of the file has been forgotten, and allows it to be output displayed in the forget-to-attach verification window 60.

Figure 9:
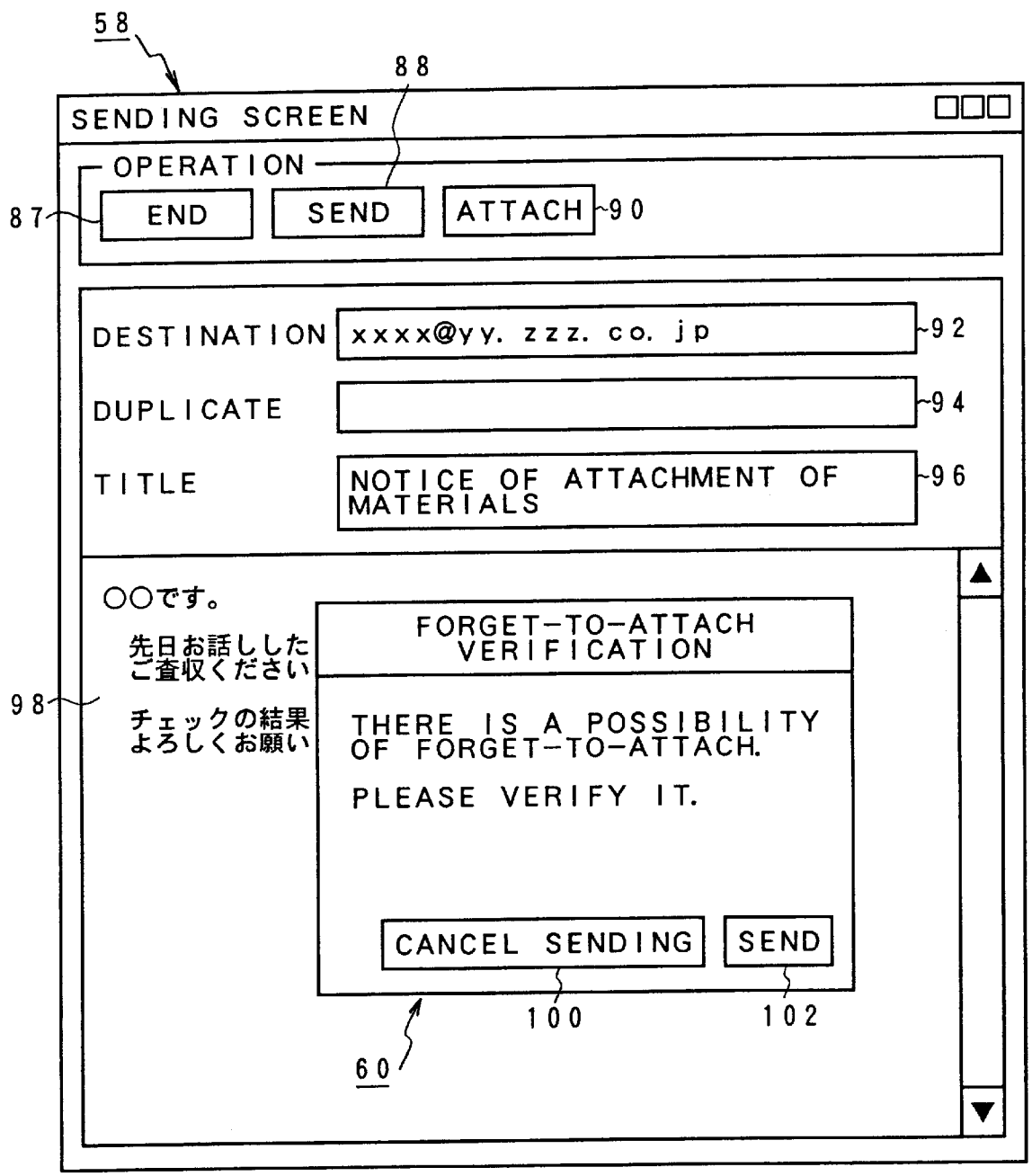
FIG. 9 is an explanatory diagram of a forget-to-attach verification window appearing on the sending screen of FIG. 2.

FIG. 9 illustrates a specific example of the forget-to-attach verification window 60 which is provided by the warning message output unit 52 and is displayed in the form of a window on the sending screen 58. On this forget-to-attach verification window 60 there appears a warning message that THERE IS A POSSIBILITY OF FORGET-TO-ATTACH, below which are provided a sending cancel button 100 and a send button 102. Therefore, the sender recognizes that the attachment of the file has been forgotten from the warning message on the forget-to-attach verification window 60, and clicks the attach button 90 with the mouse to open the attached file list window 95 as shown in FIG. 8 to thereby perform the file attachment operation. The send button 88 is again pushed to newly perform the attachment file verification processing. In this case, the attached file verification processing results in normal termination, allowing the sending processing of the electronic mail to be normally executed. On the contrary, if judgment has been made that there is no need for the attachment irrespective of the issue of the warning message by the forget-to-attach verification window 60 as shown in FIG. 9, it is possible by pushing the send button 102 to execute the sending processing of the electronic mail with no files attached in accordance with the sender's option.

Figure 10:
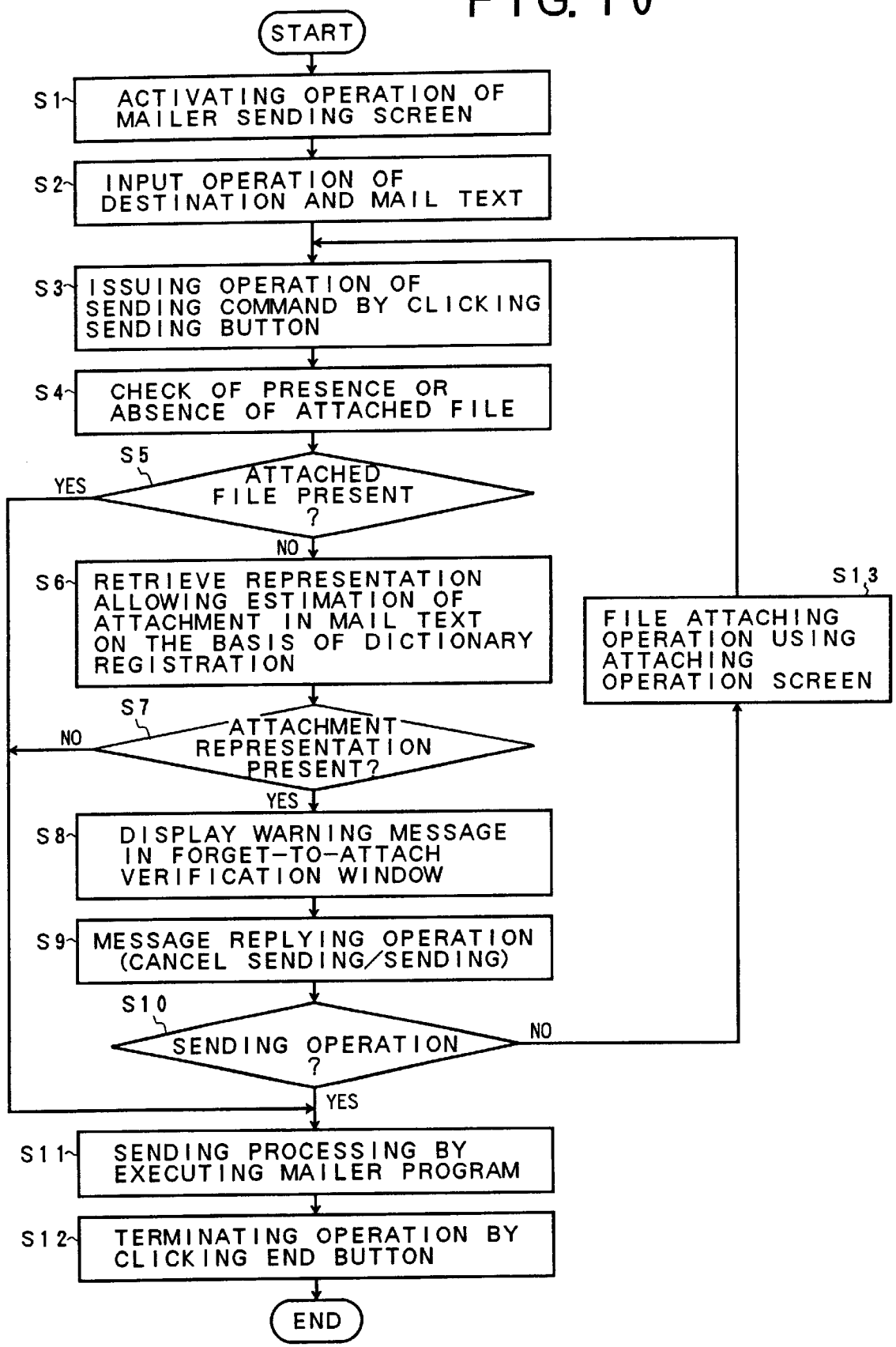
FIG. 10 is a flowchart of electronic mail processing of FIG. 2.

FIG. 10 is a flowchart of the electronic mail sending processing effected by the present invention depicted as the first embodiment in FIG. 2. First, an activating operation for opening a mailer sending screen as in FIG. 8 is performed in step Si, and then input operations of a destination and a mail text are carried out in step S2. If an attached file exists, the attach button 90 is clicked with the mouse to open the attached file list window 95 to perform a file attaching operation. After the completion of creation of the electronic mail, the send button 88 is clicked with the mouse to perform an issue operation of a sending command in step S3. After the execution of the issue operation of the sending command, a check is made in step S4 to see if an attached file is present or not by the attached file judging unit 48 provided in the attached file verifying unit 46 of FIG. 2. If the presence of an attached file is judged in step S5 from this result of check, there is no forgetting to attach the file, allowing the procedure to advance to step S11 in which sending processing is carried out through the execution of a mailer program. Upon the completion of the sending operation, the end button is clicked in step S12 to perform a terminating operation. On the contrary, if the absence of an attached file is judged in step S5, the procedure advances to step S6 in which the attachment representation retrieving unit 50 of FIG. 2 executes retrieval processing of an attachment representation allowing estimation of attachment in the mail text 66 on the basis of the dictionary registration. If no attachment representation is found in step S7 through the retrieval of the attachment representation in the mail text, no forget-to-attach exists, allowing the procedure to advance to step S11 to perform the sending processing through the execution of the mailer program. On the contrary, if the presence of an attachment representation is judged in step S7, the forget-to-attach verification window 60 is opened in step S9 as in FIG. 9 to display a warning message thereon, urging the sender to enter the operation of whether the sending is to be canceled or to be performed as a reply to the message in step S9. If a sending operation is judged as the message reply operation in step S10, the sending operation is initiated intactly by the sender's option without attaching any file, allowing the sending processing to be performed through the mailer program in step S11. On the other hand, in cases where a sending cancel operation has been judged in step S10, the procedure goes to step S13 in which the attach button 90 on the sending screen 58 is manipulated to open the attached file list window 95 as in FIG. 8 to perform file attachment operation. Then, the procedure goes again back to step S3 in which in response to the issue operation of the sending command by the click of the sending button, a check is made to see if any attached file is present or not in step S3. Since a proper attachment of a file is carried out, the presence of the attached file is judged in step S5, allowing the procedure to go to step S11 to perform the sending processing through the execution of the mailer program. Then in step S12, the end button is clicked upon the termination of the sending operation to perform a terminating operation.

Figure 11:
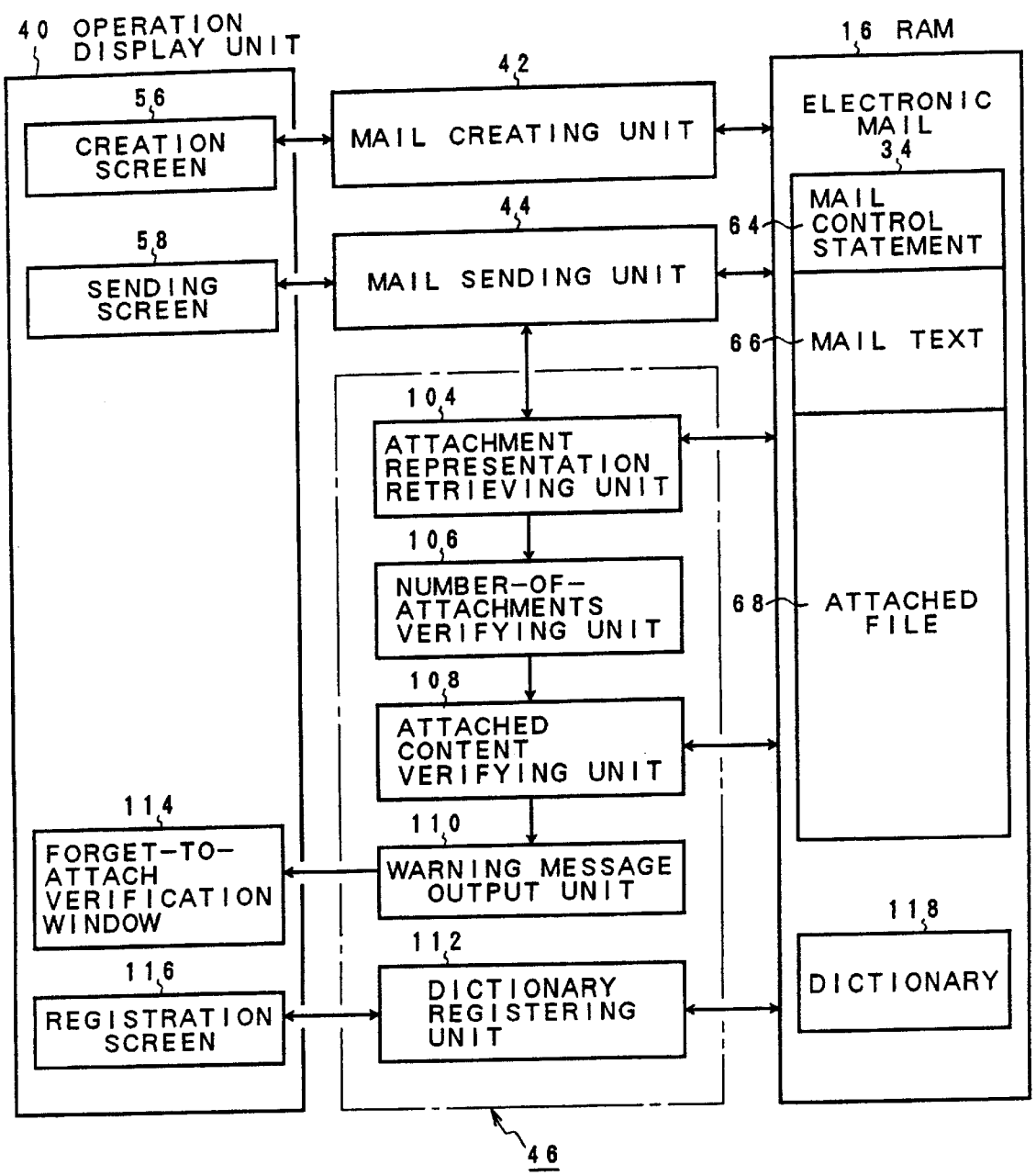
FIG. 11 is a function block diagram of a second embodiment of the present invention.
Figure 12:
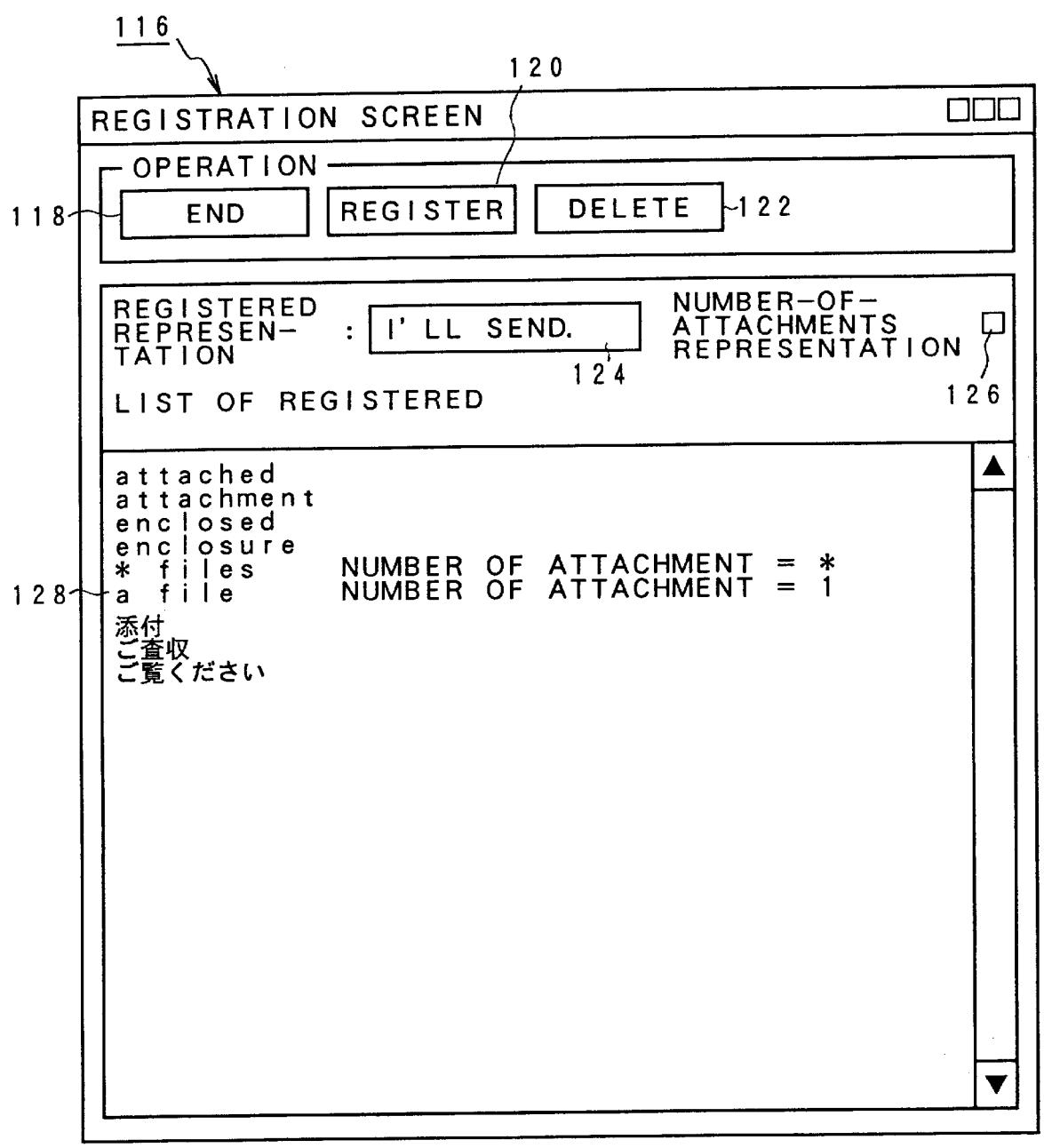
FIG. 12 is an explanatory diagram of a registration screen for use in the dictionary registration in FIG. 11.

Verification of Forgetting to Attach Files, Lack of Attachment and Content of Attachment FIG. 11 is a function block diagram of a second embodiment of an electronic mail apparatus of the present invention implemented by the mailer program 30 of FIG. 1. This second embodiment is characterized in that the number of attached files and the content of the files can be verified in addition to the forgetting to attach files of the first embodiment of FIG. 2. The electronic mail apparatus of this second embodiment comprises a mail creating unit 42, a mail sending unit 44 and an attached file verifying unit 46. The attached file verifying unit 46 includes an attachment representation retrieving unit 104, a number-of-attached files verifying unit 106, an attached content verifying unit 108, a warning message output unit 110 and a dictionary registering unit 112. First, using a registration screen 116 as in FIG. 12, the dictionary registering unit 112 registers into a dictionary 118 of the RAM 16

I. attachment representation indicative of the presence of attached files; and

II. number of attached files representation indicative of the number of attached files. The registration screen 116 is provided with an end button 118, a register button 120 and a delete button 112, below which there are newly provided an attachment representation input frame 124 and a number-of-attachment representation input frame 126. Registered in Japanese as the registered representation in the registered list 128 includes 「添付」(attached), 「ご査収」(offer) and 「ご覧ください」(refer). Registered in English are "attached", "attachment", "enclosed" and "enclosure". In addition to this, the second embodiment includes a set of a character string and the number of attached files registered as the number of attached files representation. Registered as the number of attached files representation in this example are a set "* files number of attached files=*" of the number of attached files representation "* files" and the number of attached files value "*", as well as a set "a file number-of-attachment=1" of the number of attached files representation "a file" and the number-of-attachment "1". In this case, "*" denotes an arbitrary integer equal to or more than 2.

Referring again to FIG. 11, when a sending command is imparted to the mail sending unit 44 after the creation of the electronic mail 34 by the mail creating unit 42, the attachment representation retrieving unit 104 of the attached file verifying unit 46 is activated to retrieve the mail text 66 using as the keyword the attachment representation and the number of attached files representation registered in the dictionary 118 to thereby detect a character string coincident with the attachment representation and the number of attached files representation. Simultaneously with the retrieval of the mail text 66 by the attachment representation retrieving unit 104, a retrieval of a file name is carried out.

Figure 13B:
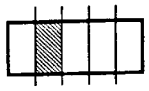
Figure 13C:
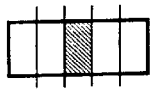
Figure 13E:

FIGS. 13A to 13E illustrate a specific example of the electronic mail 34 to be processed by the attached file verifying unit 46 of FIG. 11, in which English statements are described by way of example as the mail text 66 following the mail control statement 64 of FIG. 13A. This English mail text 66 includes a description indicative of the attachment of two attached files 68-1 and 68-2, as well as a description of the file names of the two attached files 68-1 and 68-2. More specifically, there is a description "I send following 2 files of attachment." in the mail text 66 on the 24th line of the electronic mail, from which it is seen that the number of attached files is two. In the mail text 66 on the 26th and 27th lines there are described two file names "data. xls" and "conv97. jpg". When such a mail text 66 of FIG. 13A is subjected to the retrieval of the attachment representation and the number of attached files representation by the attachment representation retrieving unit 104 of FIG. 11, the dictionary registered attachment representation "attachment" of FIG. 12 and the number of attached files representation "2 files" are obtained as the result of the retrieval and are stored in the RAM. The file name is recognized as a character string preceding the external identifier "xls", and the two file names "data.xls" and "conv97.jpg" are stored as the retrieved file names in the RAM 16. Other than the external identifiers ".xls" and ".jpg" of FIG. 13A, external identifiers such as ".doc" and ".txt" may be employed for the retrieval of file names so that character strings linked with these external identifiers can be retrieved as the file names.

Referring again to FIG. 11, after the storage of the result of retrieval of the attachment representation, the number of attached files representation and the file names through the retrieval of the mail text 66 by the attachment representation retrieving unit 104, the number of attached files verifying unit 106 performs the verifying processing of the number of attachment of the files. The number of attached files verifying unit 106 compares an estimated number N of attached files which is estimated from the number-of-attachment representation derived from the retrieval of the mail text 66 by the attachment representation retrieving unit 104 with an actual number F of the attached files obtained from the data structure of the electronic mail 34, and judges whether the two coincide with each other. The detection of the actual number F of the attached files by the number of attached files verifying unit 106 is carried out, in the same manner as the attached file judging unit 48 of FIG. 2, by retrieving the number B of the boundary information using a keyword the boundary information which has been recognized from the boundary information define statement 72 of the mail control statement 64 in the data structure of the electronic mail 34 shown in FIG. 3, and by placing it into the expression (1) to subtract 2 therefrom. The actual number F of the attached files is thus obtained. In the case of the electronic mail having the data structure shown in FIGS. 13A to 13E for instance, five different boundary information 74-1 to 74-5 is obtained from boundary information "STAR DATE(−30) 0448.56''' derived from the boundary information define statement of the mail control statement 64. Since the number B of the boundary information is equal to 4, the actual number F of the attachment files=2 is obtained by subtracting 2 therefrom on the basis of the expression (1). Then, the estimated number N of the attached files=2 obtained by the attachment representation retrieving unit 104 is identical to the actual number F of the attached files=2 by the number of attached files verifying unit 102, with the result that processing of the next attached content verifying unit 108 is activated.

Figure 14B:
Figure 14C:

In contrast with this, FIGS. 14A to 14C illustrate a case in which the same mail text 66 as that of the electronic mail of FIGS. 13A to 13E is erroneously followed only by a single attached file 68-1 in spite of having to be followed by two files in accordance with the mail text. In the case of this forget-to-attach, the number B of the boundary information obtained from the data structure of the electronic mail is three including the boundary information 74-1 to 74-3, and hence the actual number F of the attached files becomes 1 by placing it into the expression (1) to subtract therefrom. As a result, it does not coincide with the estimated number N of the attached files based on the number of attached files representation retrieved by the attachment representation retrieving unit 104, and (Estimated number N of attached files)>(Actual number F of attached files) results. Thus, the attached files lack in number and a warning message indicative of lack of attached files is created. After the completion of such processing of the number of attached files verifying unit 106, the attached content verifying unit 108 is put in operation. The attached content verifying unit 108 verifies whether attachment is made of an attached file 68 coincident with a file name in the mail text 66 retrieved by the attachment representation retrieving unit 104. This verification of the file name is carried out through the comparison and collation with file names contained in the file parameters 76-1 to 76-3 in the text format at the leading portions of the attached files 68-1 to 68-3 of the electronic mail 34 shown in FIG. 3. Taking the case of the electronic mail of FIGS. 13A to 13E for instance, "filename="data.xls" is described as the file name in the file parameter 76-1 of the first attached file 68-1 of FIGS. 13A so that there is obtained coincidence and collation with the file name on the other hand recorded by the attachment representation retrieving processing. In addition, "filename="conv97.jpg" is described as the file name in the leading parameter 76-2 of the second attached file 68-2 of FIG. 13B so that there is obtained coincidence and collation with the next file name recorded by the attachment representation retrieving processing in the same manner. On the contrary, in the case of the electronic mail in which the sender has forgotten the attachment of one attached file of FIGS. 14A to 14C, only the file name "filename="data.xls" in the file parameter 76-1 of the attached file 68-1 acquires coincidence and collation, thereby making it to verify that a file having the file name "conv97.jpg" identified from the mail text 66 is not attached. For this reason, in cases where an attached file name coincident with the file name obtained through the retrieval of the mail text 66 is not acquired, the attached content verifying unit 108 of FIG. 11 creates a warning message indicative of the absence of the attachment of that file name. The warning message output unit 110 provides for display to the forget-to-attach verification window 114 a warning message created in the number of attached files verifying unit 106 and the attached content verifying unit 108.

Figure 15:
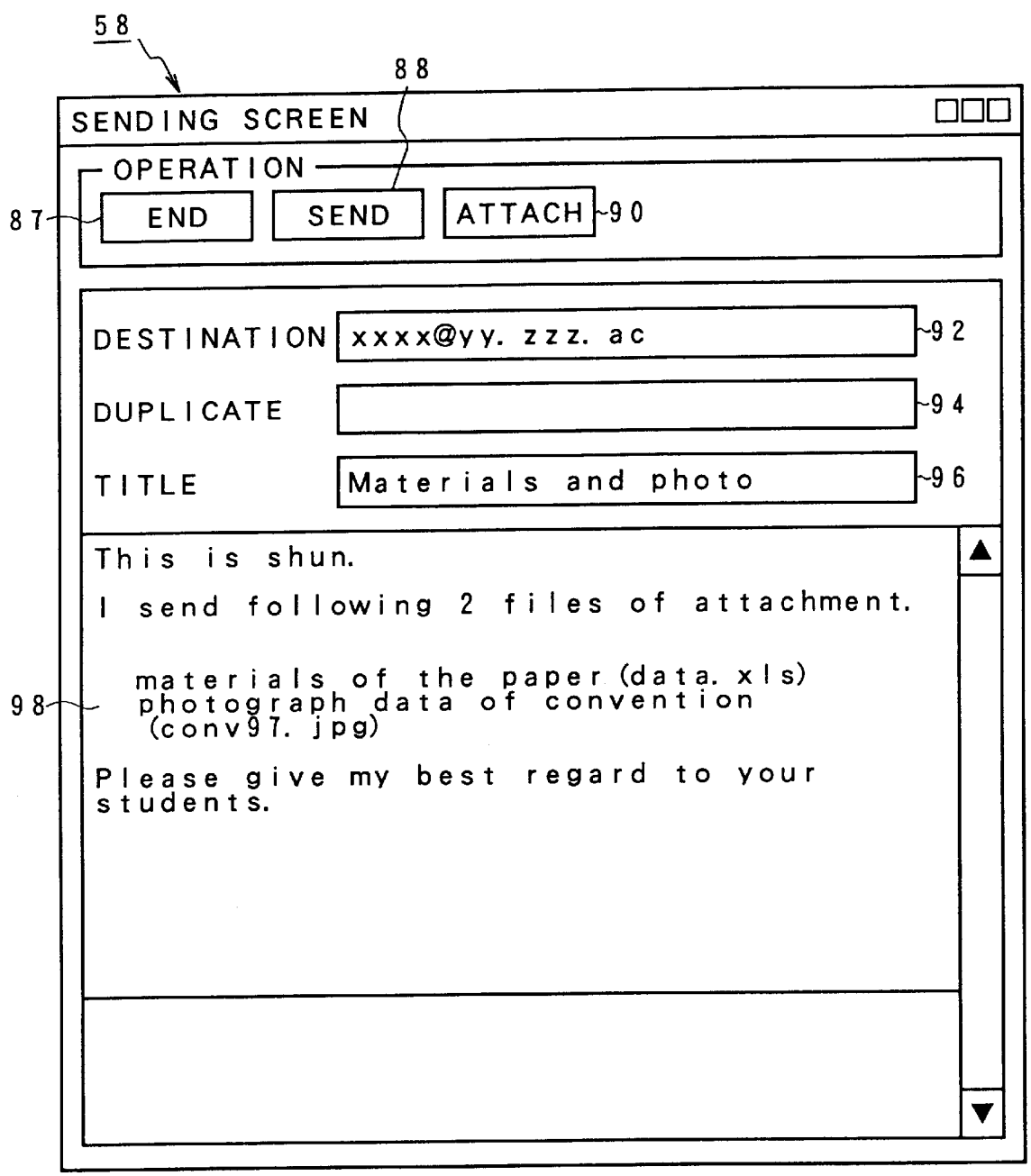
FIG. 15 is an explanatory diagram of a sending screen for use in the sending in FIG. 11.
Figure 16:
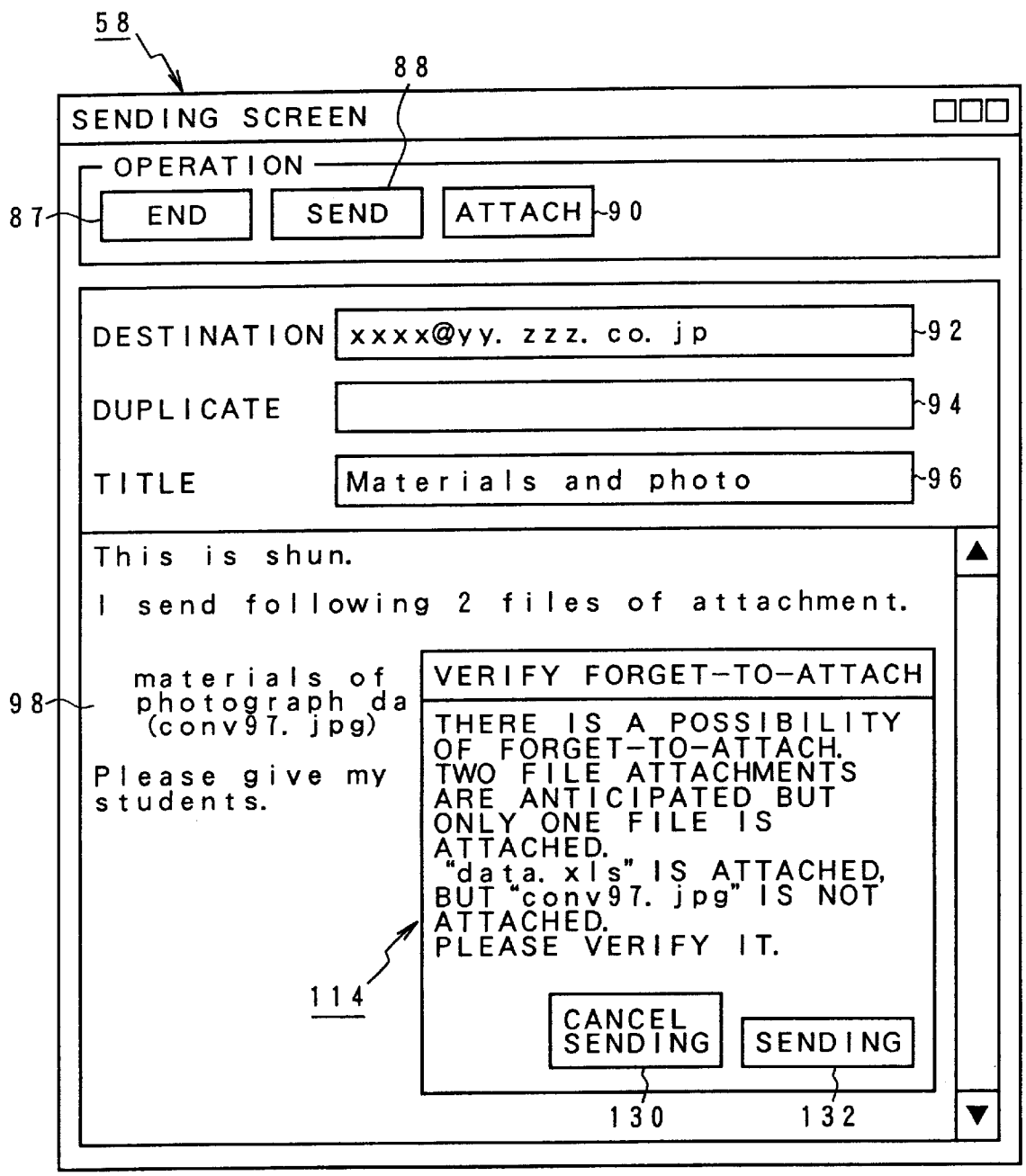
FIG. 16 is an explanatory diagram of a forget-to-attach verification window appearing on the sending screen of FIG. 15.

FIG. 15 illustrates a sending screen 56 for use in the creation of the electronic mail of FIGS. 13A to 13E or FIGS. 14A to 14c, which screen is the same as the sending screen 58 of the first embodiment of FIG. 8 and has a mail screen on which an English mail text is described. When a sending command is issued by clicking the send button 88 on the sending screen 58, verification processing is performed by the attached file verifying unit 46 of FIG. 11. In cases where a lack in the number of attached files and a difference in the file names have been verified, the forget-to-attach verification window 114 is displayed on the sending screen as in FIG. 16 by the warning message output unit 110. Taking the case of the data structure of the. electronic mail of FIGS. 14A to 14C for instance, this forget-to-attach verification window 114 displays in response to the lack in the number of attached files a warning message "There is a possibility of forget-to-attach. Two file attachment is anticipated, but only one file is attached." As to the content of attachment as well, there appears a warning message ""data.xls" is attached, but "conv97.jpg" is not attached. Please verify it" In cases where such a warning message has been issued by the forget-to-attach verification window 114, the sending cancel button 130 is clicked if the forget-to-attach file is desired to be newly attached for sending. In case it is desired by the judgment of the sender that the sending be performed without attaching the file which has been pointed out to be absent, the sending button 132 is clicked.

Figure 17:
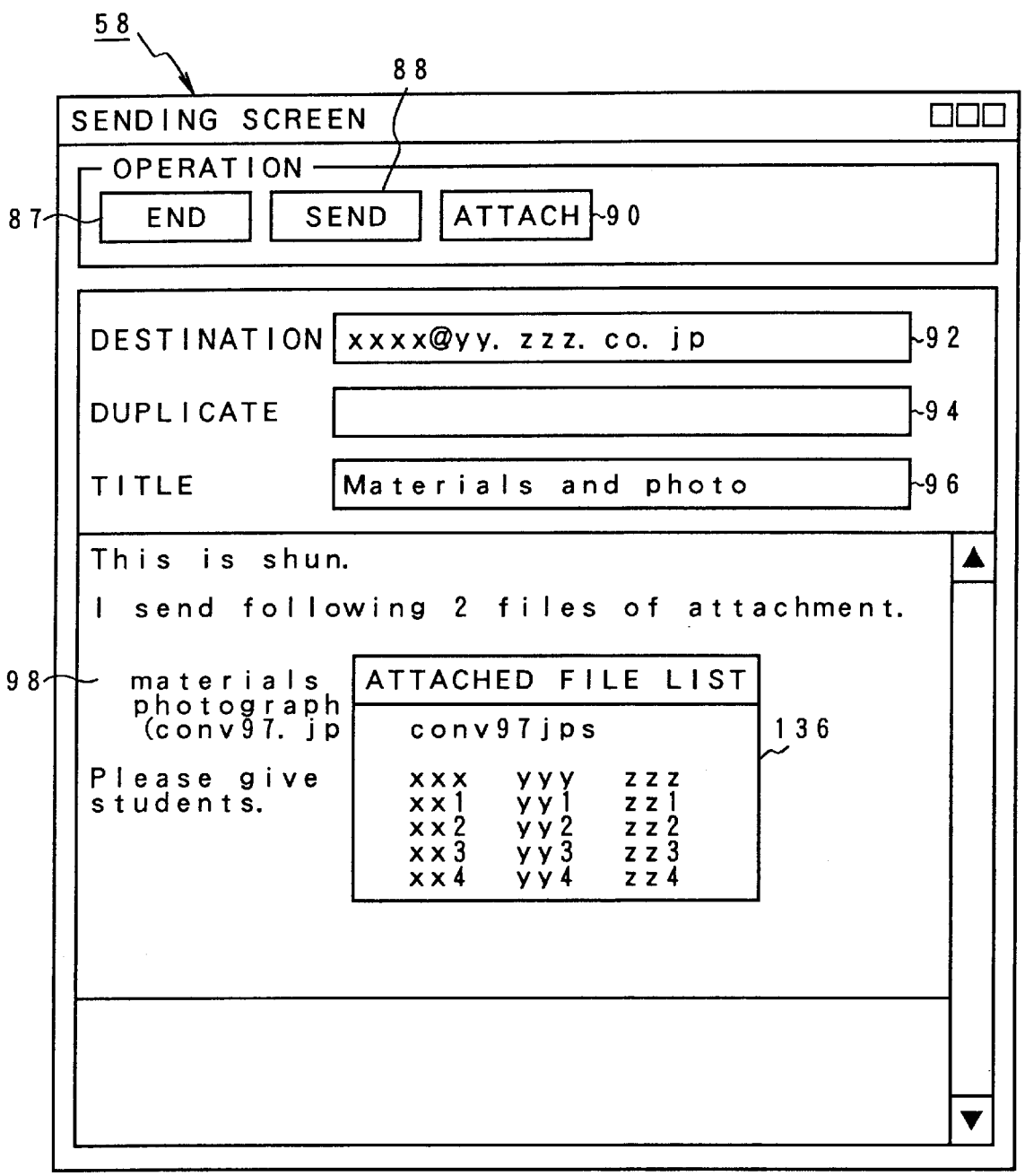
FIG. 17 is an explanatory diagram of an attached file list window appearing on the sending screen of FIG. 15.

When clicking the sending cancel button 130 in the forget-to-attach verification window 114, the screen returns to the sending screen 56 of FIG. 15. When clicking the attach button 90 in this sending screen 56, an attached file list window 136 is deployed as in FIG. 17. A corresponding file list name is selected and attached, and the sending button 88 is again clicked to thereby make it possible to execute the sending processing of the electronic mail in the proper attached files state.

FIGS. 18A to 18C are flowcharts of the processing actions of the electronic mail apparatus of the second embodiment in accordance with the present invention of FIG. 11. First in step S1 the mailer sending screen as in FIG. 15 is activated, and in step S2 a destination and a mail text is entered. For this entry operation, the attach button 90 is clicked to open the attached file list window 136 for each of the two files as in FIG. 17 to perform the file attaching operation. Then in step S3 the sending button 88 is clicked to perform a sending command issuing operation. In response to the execution of the issuing operation of the sending command, the attachment representation retrieving unit 104 of FIG. 11 is operated, allowing the attachment representation retrieval processing in steps S4 to S7 to be executed. That is, in step S4 one of the registered contents is fetched from the dictionary 118 to retrieve the attachment representation, the number of attached files representation or the attached file name in the mail text 66. If in step S5 there is found an attachment representation or an attached file name, then in step S6 the attachment representation or the attached file name is stored in the RAM 16. Then in step S7 a check is made to see if all the attachment representations registered in the dictionary 118 have been retrieved, and if no the procedure goes again back to step S4 in which next dictionary registered attachment representation is fetched to repeat the retrieval processing for the mail text 66. In the case of the retrieval of the attached file name, retrieved as a file name are character strings linked with the external identifiers such as "xls", ".jpg", ".txt", ".doc" in place of attachment representations registered in the dictionary. After the completion of the retrieval processing of the attachment representation and the attached file name for the mail text in steps S4 to S7, a check is made to see if the result of retrieval of the attachment representation and/or the attached file name is present. If the retrieval is absent, the procedure advances to step S20 of FIG. 18B in which the mailer program is executed to perform the sending operation. On the contrary, in cases where in step S8 there has been obtained a result of retrieval that the attachment representation and/or the attached file name is present, processing shown in steps S9 to S12 is executed by the number of attached files verifying unit 106 of FIG. 11. First in step S9, the estimated number N of the attached files is recognized from the number of attached files representation in the mail text. Then in step S10 the actual number F of the attached files is recognized by subtracting 2 as in the expression (1) from the number B of the boundary information in the data structure of the electronic mail 34 shown in FIG. 3. Then in step S11 it is judged whether the estimated number N of the attached files is coincident with the actual number F of the attached files. If it is not coincident, then in step S12 a warning message is created which is indicative of a non-coincidence in the number of attached files. In cases where the actual number F of the attached files is smaller than the estimated number N of the attached files (N<F), this warning message is in the form of a warning message indicative of a lack in the number of files. In cases where the actual number F of the attached files is larger than the estimated number N of the attached files (F>N), a warning message is created which is indicative of excess attachment of the attached files.

Then in steps S13 to S16 of FIG. 18B, the processing of the attached content verifying unit 108 of FIG. 11 is executed. First in step S13 a check is made to see if the RAM 16 has a memory of the result of retrieval of the file names in the text, and if no, the processing in steps S14 to S16 is skipped. If the RAM 16 has a memory of the result of retrieval of the file names in the text, then in step S14 file names are retrieved which are character strings in the text format described in the file parameters at the leading positions of the attached files. In the retrieval of the file names in this case as well, the character strings following the external identifiers such as ".xls", ".jpg" could be employed as the file names. Then in step S15 it is judged that a file name retrieved from the mail text 66 is coincident with a file name retrieved from the attached file, and if not coincident, in step S16 a warning message is created which is indicative of a non-coincidence of the attached file name. On the contrary, if the file names are coincident with each other, the procedure advances to step S22 in which it is judged whether the coincidence in the number of attached files is acquired through the processing of steps S9 to S12. If the number of attached files is coincident, the attached files are normal, allowing the procedure to advance to step S20 to perform the sending processing through the execution of the mailer program. On the contrary, if the number of attached files is not coincident, the procedure advances to step S17. That is, this embodiment makes an AND judgment of two parameters, the number of attached files of the attached files and the content of the attachments, and the procedure is allowed to go to step S17 in cases where the two are not established or either one is not established. In step S17, the warning message output unit 110 of FIG. 11 provides for display to the forget-to-attach verification window 114 a warning message indicative of a lack in the number of attached files created in step S12 and/or step S16 and/or a warning message indicative of non-coincidence of the file names. Then in step S18, a sending cancel or sending is performed as a reply operation of the operator to the warning message. If in step S19 the sending operation is determined as the reply operation, the electronic mail is sent as it is by the sender's will in spite of the presence of a lack of the attached files or non-coincidence in the content of the files in step S20. In the case of the sending cancel, the attach button is operated in step S23 to open the attached file list window 136 as in FIG. 17 to perform the attaching operation, after which the procedure returns to step S2 of FIG. 18A for again performing the verification processing. In this case, through the steps S2 to S15 and S22, normal verification of the state of attachment of the attached files is performed, and in step S20 the electronic mail sending processing is executed. Upon the termination of sending, the terminating operation can be carried out in step S22.

An embodiment of a computer readable record medium in which is recorded the electronic mail program of the present invention can include a removable, transportable record medium such as a CD/ROM and a floppy disk as a record medium which is an object of the present invention, a storage device of the program provider who provides a program through a line, a processing unit in which the program has been installed, and a memory device such as a RAM and a hard disk. The electronic mail program provided by the record medium is loaded into the processing device and is executed on its main memory.

According to the present invention in this manner, a check is made to see if the mail text contains an attachment representation indicative of the presence of the attached files, and if absent, the sender is urged to verify the forget-to-attach so that the sender can judge whether the file attaching operation is needed or not upon the sending. If needed the attachment can be effected, whereas if unneeded the sending can be effected with disregard, whereby it is possible to perform smooth electronic mail sending processing which appropriately reflects the content of the mail and the sender's will in accordance with the situations. Furthermore, the present invention judges, in addition to the forgetting to attach files, a lack of attached files and erroneous attachment of files in the case of attachment of files to thereby urge the sender to verify it, whereby it is possible to securely perform the sending of the electronic mail with attached files intended by the sender. As a result of this, there can be prevented in advance not only the necessity for labor hours on the sender side and the receiver side caused by the resending of the electronic mail due to the lack or error of the attached files but also embarrassment attributable to the forget-to-attach on the sender side. Furthermore, there can be securely prevented an accident that the business utilizing the electronic mail may be delayed because of being unnoticed of forgetting to attach files which are expected to be attached.

Although the above embodiments employ by way of example Japanese and English statements as the mail text of the electronic mail, the present invention could be applicable to other languages in just the same manner. It will further be appreciated that it is possible to appropriately modify the present invention without impairing the object and advantages of the present invention and that the present invention is not restricted by the numerical values, data formats, file formats, etc. shown in the above embodiments.

What is claimed is:

1. An electronic message apparatus for creating and sending an electronic message, comprising:

a checker determining, before sending the electronic message, whether the electronic message has a representation that there should be one or more files attached to the electronic message, based upon said electronic message including a mail control statement including a boundary information define statement, and upon said electronic message including boundary information and mail text; and a display controller displaying a warning message in a first window if the status of files actually attached to the electronic message contradicts the representation determined by the checker, wherein the electronic message apparatus checks contradiction between contents of the electronic message and the status of the files attached to the electronic message and displays in a second window a list of files from which a sender selects to attach to the electronic message if there is a contradiction and based upon selection of buttons by the sender.

2. The electronic message apparatus according to claim 1, wherein the representation relates to the presence of one or more attached files.

3. The electronic message apparatus according to claim 1, wherein the representation relates to the number of attached files.

4. The electronic message apparatus according to claim 3, wherein said warning message displayed by the display controller includes whether the number of actually attached files is greater than the number of files in the representation.

5. The electronic message apparatus according to claim 3, wherein the displayed warning message includes whether the number of actually attached files is fewer than the number of files in the representation.

6. The electronic message apparatus according to claim 1, wherein the representation relates to attached file names.

7. The electronic message apparatus according to claim 6, wherein the displayed warning message includes file names which are not actually attached to the electronic message, but are found in the electronic message by the checker.

8. The electronic message apparatus according to claim 1, further including a registration file to register representations that there should be attached files in the electronic message; and the checker determines by using said registration file.

9. The electronic message apparatus according to claim 8, wherein the registration file includes at least one of words selected from the list: attached, attachment, enclosed, and enclosure.

10. The electronic message apparatus according to claim 8, wherein the registration file is editable by a user.

11. The electronic message apparatus according to claim 1, wherein the representation includes at least one of words selected from the list: attached, attachment, enclosed, and enclosure.

12. The electronic message apparatus according to claim 1, wherein the checker is activated when a user clicks an electronic message sending button.

13. The electronic message apparatus according to claim 1, wherein the sender sends an electronic message with no files attached using the first window in accordance with the sender's option.

14. An electronic message apparatus for creating and sending an electronic message, comprising:
   checker means for checking whether the electronic message has a representation that there should be one or more attached files before sending the electronic message based upon said electronic message including a mail control statement including a boundary information define statement, and upon said electronic message including boundary information and mail text; and
   display control means for displaying in a first window a warning message if the status of files actually attached to the electronic message contradicts the representation found by the checker means, wherein the electronic message apparatus checks contradiction between contents of the electronic message and the status of the files attached to the electronic message and displays in a second window a list of files from which a sender selects to attach to the electronic message if there is a contradiction and based upon selection of buttons by the sender.

15. A program product recorded on computer readable medium, said program product comprising:
   a checker determining whether an electronic message has a representation that there should be one or more attached files before sending the electronic message based upon said electronic message including a mail control statement including a boundary information define statement, and upon said electronic message including boundary information and mail text; and
   a display controller displaying a warning message in a first window if the status of files actually attached to the electronic message contradicts the representation found by the checker means, wherein the program product checks contradiction between contents of the electronic message and the status of the files attached to the electronic message and displays in a second window a list of files from which a sender selects to attach to the electronic message if there is a contradiction and based upon selection of buttons by the sender.

16. The program product according to claim 15, wherein the representation relates to the presence of files attached to the electronic message.

17. The program product according to claim 15, wherein the representation relates to the number of attached files.

18. The program product apparatus according to claim 17, wherein the displayed warning message includes whether the number of actually attached files is more than the number of files in the representation.

19. The program product according to claim 17, wherein the displayed warning message includes whether the number of actually attached files is fewer than the number of files in the representation.

20. The program product according to claim 17, wherein the representation relates to attached file names.

21. The program product according to claim 20, wherein the displayed warning message includes file names which have not yet been attached to the electronic message, but are found in the electronic message by the checker means.

22. The program product according to claim 15, further including a registration file to register representations that there should be one or more attached files in the electronic message; and the checker means checks by using the registration file.

23. The program product according to claim 22, wherein the registration file includes at least one of words selected from the list: attached, attachment, enclosed, and enclosure.

24. The program product according to claim 15, wherein the representation includes at least one of words selected from the list: attached, attachment, enclosed, and enclosure.

25. The program product according to claim 15, wherein the registration file is editable by a user.

26. The program product according to claim 15, wherein the checker means is activated when the user clicks an electronic message sending button.

27. A program product recorded on computer readable medium, said program product comprising:
   program code checking means for checking whether an electronic message has a representation that there should be one or more attached files before sending the electronic message based upon said electronic message including a mail control statement including a boundary information define statement, and upon said electronic message including boundary information and mail text;
   program code display means for displaying a warning message in a first window if the status of files actually attached to the electronic message contradicts the representation found by the program code checking means, wherein the program product checks contradiction between contents of the electronic message and the status of the files attached to the electronic message and displays in a second window a list of files from which a sender selects to attach to the electronic message if there is a contradiction and based upon selection of buttons by the sender.

28. A method for processing an electronic message, comprising:

determining, before sending the electronic message, a representation indicative of whether one or more files should be attached to the electronic message based upon said electronic message including a mail control statement including a boundary information define statement, and upon said electronic message including boundary information and mail text;

verifying the status of any files actually attached to the electronic message; and displaying a warning message in a first window if the determined representation is not consistent with the verified status, wherein the method checks contradiction between contents of the electronic message and the status of the files attached to the electronic message and displays in a second window a list of files from which a sender selects to attach to the electronic message if there is a contradiction and based upon selection of buttons by the sender.

29. A method for processing an electronic message, comprising:

determining, before sending the electronic message, a representation indicative of the number of files which should be attached to the electronic message based upon said electronic message including a mail control statement including a boundary information define statement, and upon said electronic message including boundary information and mail text;

verifying the number of files actually attached to the electronic message; and displaying a warning message in a first window if the determined representation is not equal to the verified number, wherein the method checks contradiction between contents of the electronic message and the status of the files attached to the electronic message and displays in a second window a list of files from which a sender selects to attach to the electronic message if there is a contradiction and based upon selection of buttons by the sender.

30. A method for processing an electronic message, comprising:

determining, before sending the electronic message, a representation indicative of the files which should be attached to the electronic message based upon said electronic message including a mail control statement including a boundary information define statement, and upon said electronic message including boundary information and mail text;

verifying the files actually attached to the electronic message; and displaying a warning message in a first window if the determined representation is not equal to the verified files, wherein the method checks contradiction between contents of the electronic message and the status of the files attached to the electronic message and displays in a second window a list of files from which a sender selects to attach to the electronic message if there is a contradiction and based upon selection of buttons by the sender.

* * * * *

UNITED STATES PATENT AND TRADEMARK OFFICE
CERTIFICATE OF CORRECTION

PATENT NO.    : 6,453,338 B1
DATED         : September 17, 2002
INVENTOR(S)   : Taku Shiono It is certified that error appears in the above-identified patent and that said Letters Patent is hereby corrected as shown below:

<u>Title page,</u>
Item [56], References Cited, please change the third reference from "5,283,262" to -- 5,283,856 --.

Signed and Sealed this

Twenty-fifth Day of February, 2003

JAMES E. ROGAN
*Director of the United States Patent and Trademark Office*